US011755659B2

(12) United States Patent
Okuno et al.

(10) Patent No.: US 11,755,659 B2
(45) Date of Patent: Sep. 12, 2023

(54) DOCUMENT SEARCH DEVICE, DOCUMENT SEARCH PROGRAM, AND DOCUMENT SEARCH METHOD

(71) Applicant: Resonac Corporation, Tokyo (JP)

(72) Inventors: Yoshishige Okuno, Tokyo (JP); Takuya Minami, Tokyo (JP); Eriko Takeda, Tokyo (JP); Hajime Hotta, Tokyo (JP)

(73) Assignee: Resonac Corporation, Tokyo (JP)

( * ) Notice: Subject to any disclaimer, the term of this patent is extended or adjusted under 35 U.S.C. 154(b) by 197 days.

(21) Appl. No.: 17/282,036

(22) PCT Filed: Sep. 26, 2019

(86) PCT No.: PCT/JP2019/038016
§ 371 (c)(1),
(2) Date: Apr. 1, 2021

(87) PCT Pub. No.: WO2020/071252
PCT Pub. Date: Apr. 9, 2020

(65) Prior Publication Data
US 2021/0374189 A1    Dec. 2, 2021

(30) Foreign Application Priority Data
Oct. 4, 2018    (JP) .................................. 2018-189438

(51) Int. Cl.
*G06F 16/903*    (2019.01)
*G06F 16/907*    (2019.01)
(Continued)

(52) U.S. Cl.
CPC .... *G06F 16/90344* (2019.01); *G06F 16/5866* (2019.01); *G06F 16/907* (2019.01); *G06F 16/93* (2019.01)

(58) Field of Classification Search
CPC .......... G06F 16/90344; G06F 16/5866; G06F 16/907; G06F 16/93
See application file for complete search history.

(56) References Cited

U.S. PATENT DOCUMENTS 6,470,336 B1 * 10/2002 Matsukawa ............. G06F 16/93
382/229
6,944,344 B2 * 9/2005 Imagawa ............. G06V 30/268
382/229

(Continued)

FOREIGN PATENT DOCUMENTS

EP    1492036 A2 *  12/2004  ....... G06F 17/30672
JP    2000-076292    3/2000
(Continued)

OTHER PUBLICATIONS

International Search Report dated Dec. 10, 2019 with respect to No. PCT/JP2019/038016.

*Primary Examiner* — Robert W Beausoliel, Jr.
*Assistant Examiner* — Susan F Rayyan
(74) *Attorney, Agent, or Firm* — IPUSA, PLLC

(57) ABSTRACT

A document search device includes a document search unit configured to search for an input keyword in a document database in which document information including text data is stored, the text data being extracted, by using a character recognition process, from document image data generated by imaging a paper document, a similar keyword selecting unit configured to select a similar keyword in accordance with a degree of similarity to the input keyword, from a group of wildcard strings generated from the input keyword, and cause the document search unit to search for the similar keyword in the document database, and an output unit configured to output a search result obtained by searching (Continued)

for the input keyword in the document database and a search result obtained by searching for the similar keyword in the document database.

12 Claims, 19 Drawing Sheets

(51) Int. Cl.
*G06F 16/93* (2019.01)
*G06F 16/58* (2019.01)

(56) References Cited

U.S. PATENT DOCUMENTS

| | | | | |
|---|---|---|---|---|
| 7,475,061 | B2* | 1/2009 | Bargeron | G06F 16/93 707/E17.022 |
| 7,761,464 | B2* | 7/2010 | Radlinski | G06F 16/9535 707/706 |
| 8,620,083 | B2* | 12/2013 | King | G06V 30/153 345/468 |
| 9,094,647 | B2* | 7/2015 | Williamson | H04N 5/66 |
| 9,916,383 | B1* | 3/2018 | Ching | G06F 16/93 |
| 2008/0071765 | A1* | 3/2008 | Ichiriu | G06F 16/90344 707/999.005 |
| 2008/0097984 | A1* | 4/2008 | Candelore | H04N 21/4622 707/999.005 |
| 2009/0077037 | A1* | 3/2009 | Wu | G06F 16/90324 |
| 2010/0082709 | A1* | 4/2010 | Yamamoto | G06F 16/93 715/255 |
| 2010/0177964 | A1* | 7/2010 | King | G06F 16/41 382/177 |
| 2012/0131049 | A1* | 5/2012 | Ogilvie | G06F 16/951 707/769 |
| 2012/0323901 | A1* | 12/2012 | Masuko | G06V 30/224 707/723 |
| 2013/0198244 | A1* | 8/2013 | Albrecht | G06F 16/93 726/17 |
| 2015/0046437 | A1* | 2/2015 | Connors | G06F 16/358 707/723 |
| 2016/0210532 | A1 | 7/2016 | Soldevila et al. | |
| 2017/0154126 | A1* | 6/2017 | Ballentine | G06F 16/90344 |
| 2017/0334722 | A1* | 11/2017 | Schwefer | B01D 53/8628 |
| 2019/0205690 | A1* | 7/2019 | Shanmugavel | G06V 10/273 |
| 2019/0278812 | A1* | 9/2019 | Otsuka | G06F 16/90344 |

FOREIGN PATENT DOCUMENTS

| | | |
|---|---|---|
| JP | 2001-134617 | 5/2001 |
| JP | 2002-063197 | 2/2002 |
| JP | 2004-213091 | 7/2004 |
| JP | 2006-139659 | 6/2006 |
| JP | 2012-141742 | 7/2012 |
| JP | 2016-134175 | 7/2016 |

* cited by examiner

FIG.3

DOCUMENT IMAGE DATABASE 210

| DOCUMENT ID | DOCUMENT NAME | DOCUMENT IMAGE DATA |
|---|---|---|
| 1 | JANUARY 2018 MONTHLY REPORT | 201801.pdf |
| 2 | MARCH 20TH WEEKLY REPORT | 2003WE.jpg |
| 3 | 0320 BUSINESS TRIP REPORT | 0320su.jpg |
| .. | .. | .. |

| WILDCARD STRING | KEYWORD TO BE COMPARED | COMPARISON RESULT | DEGREE OF SIMILARITY |
|---|---|---|---|
| 水酒化 | 水酸化 | △○○ | 67% |
| | 酸化 | ×△△ | 50% |
| | 水素化 | △△× | 50% |
| | 水酸基 | ×○△ | 33% |

| WILDCARD STRING | KEYWORD TO BE COMPARED | COMPARISON RESULT | DEGREE OF SIMILARITY |
|---|---|---|---|
| 水酸可 | 水酸化 | ○○○ | 67% |
| | 酸化 | ×○× | 33% |
| | 水素化 | ○×× | 33% |
| | 水酸基 | ○○× | 67% |

| WILDCARD STRING | KEYWORD TO BE COMPARED | COMPARISON RESULT | DEGREE OF SIMILARITY |
|---|---|---|---|
| 水素イ | 水酸化 | ○×△ | 43% |
| | 酸化 | ×△△ | 17% |
| | 水素化 | ○▲△ | 58% |
| | 水酸基 | ×○× | 33% |

| WILDCARD STRING | KEYWORD TO BE COMPARED | COMPARISON RESULT | DEGREE OF SIMILARITY |
|---|---|---|---|
| 水酒化 | 水酸化 | ○△○ | 84% |
| | 酸化 | ×○× | 67% |
| | 水素化 | ○○○ | 67% |
| | 水酸基 | ○○× | 67% |

| WILDCARD STRING | KEYWORD TO BE COMPARED | COMPARISON RESULT | DEGREE OF SIMILARITY |
|---|---|---|---|
| 水変使 | 水酸化 | ○×△ | 50% |
| | 酸化 | ×××△ | 17% |
| | 水素化 | ○▲△ | 58% |
| | 水酸基 | ○○× | 33% |

| WILDCARD STRING | KEYWORD TO BE COMPARED | COMPARISON RESULT | DEGREE OF SIMILARITY |
|---|---|---|---|
| 力酸ヒ | 水酸化 | ×○△ | 50% |
| | 酸化 | ×○△ | 50% |
| | 水素化 | ×△× | 17% |
| | 水酸基 | ×○× | 33% |

| WILDCARD STRING | KEYWORD TO BE COMPARED | COMPARISON RESULT | DEGREE OF SIMILARITY |
|---|---|---|---|
| 秘酸化 | 水酸化 | ×○○ | 67% |
| | 酸化 | ×○○ | 67% |
| | 水素化 | ××× | 33% |
| | 水酸基 | ×○× | 33% |

LIST OF SEARCH RESULTS
― 301
― 302
― 303

| DOCUMENT ID | DOCUMENT NAME | SEARCH KEYWORD |
|---|---|---|
| 1 | JANUARY 2018 MONTHLY REPORT | 水酸化 |
| 3 | 0320 BUSINESS TRIP REPORT | 水酸化 |
| 2 | MARCH 20TH WEEKLY REPORT | 水酒化 |
| 5 | JULY 2018 MONTHLY REPORT | 水酒化 |
| 11 | 1998 ANNUAL REPORT | 水酒化 |
| 12 | MAY 1995 MONTHLY REPORT | 水酒化 |
| : | : | : |

LIST OF SEARCH RESULTS OF SEARCHING FOR INPUT KEYWORD "水酸化" ~101

| DOCUMENT ID | DOCUMENT NAME | |
|---|---|---|
| 1 | JANUARY 2018 MONTHLY REPORT | ← P |
| 3 | 0320 BUSINESS TRIP REPORT | |

302A

LIST OF SEARCH RESULTS OF SEARCHING FOR SIMILAR KEYWORD "水酒化" ~102A

| DOCUMENT ID | DOCUMENT NAME |
|---|---|
| 2 | MARCH 20TH WEEKLY REPORT |
| 5 | JULY 2018 MONTHLY REPORT |

302B (DEGREE OF SIMILARITY TO INPUT KEYWORD: 70%) ~95A

LIST OF SEARCH RESULTS OF SEARCHING FOR SIMILAR KEYWORD "氷酒化" ~102B

| DOCUMENT ID | DOCUMENT NAME |
|---|---|
| 11 | 1998 ANNUAL REPORT |
| 12 | MAY 1995 MONTHLY REPORT |

303B (DEGREE OF SIMILARITY TO INPUT KEYWORD: 84%) ~95B

301A

303

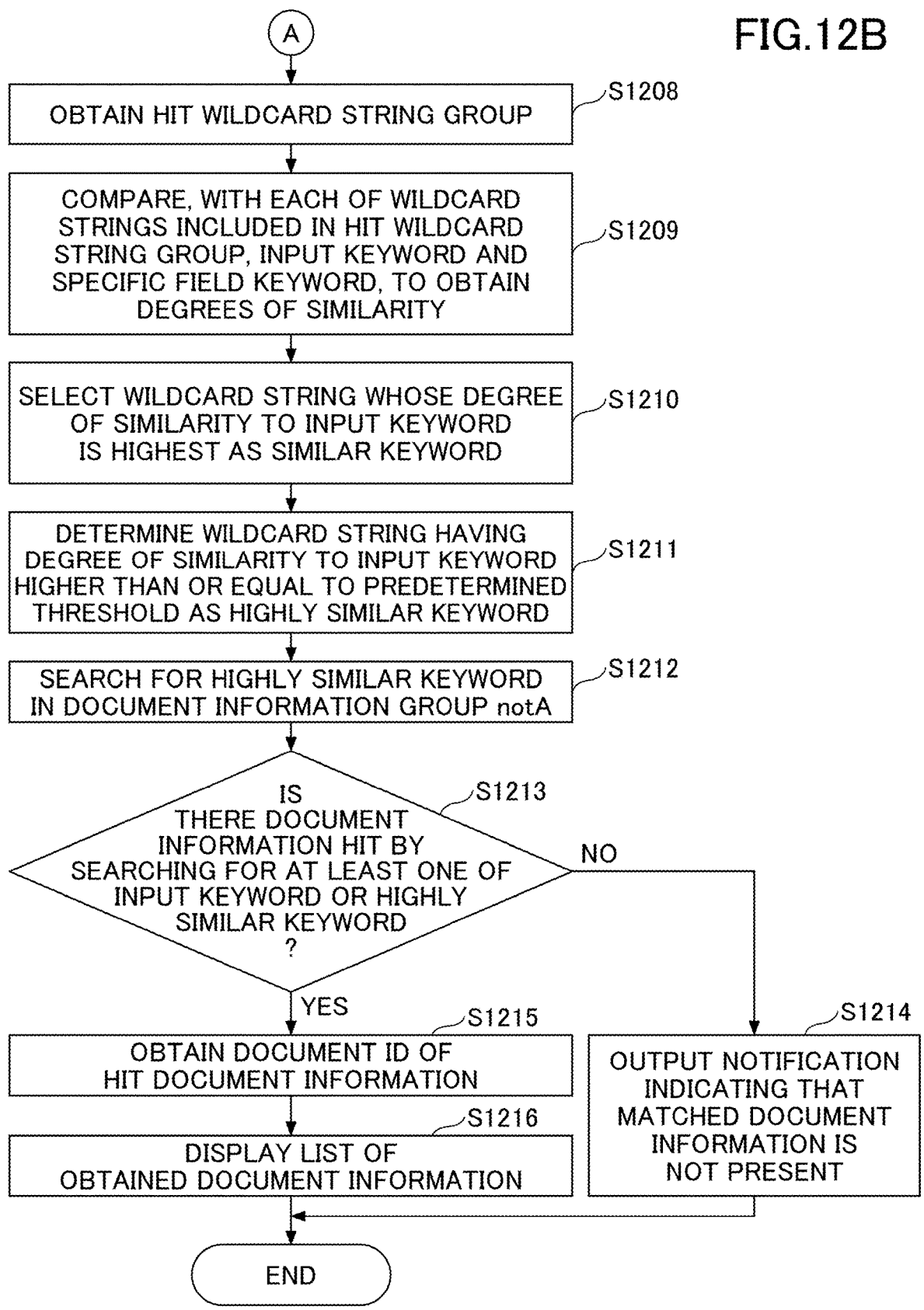

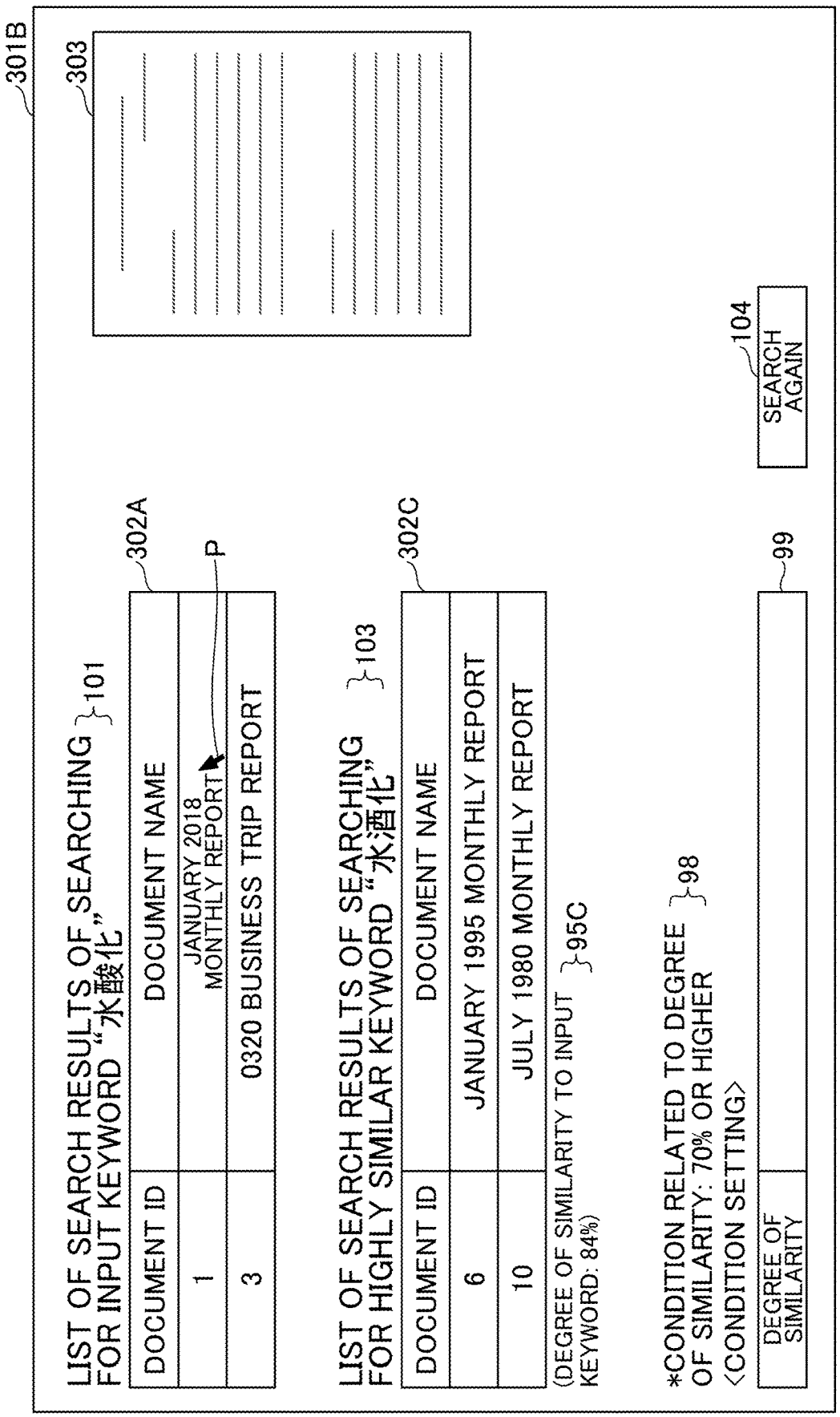

DOCUMENT SEARCH DEVICE, DOCUMENT SEARCH PROGRAM, AND DOCUMENT SEARCH METHOD

TECHNICAL FIELD

The present invention relates to a document search device, a document search program, and a document search method.

BACKGROUND ART

Some technical documents prepared in technology development in an era centered in the high economic growth period were prepared by hand with paper media. These handwritten technical documents are treasure troves of technology and know-how, and may be used to solve technical issues currently faced. In forms of paper documents, however, there are difficulties, such as requiring time to collect paper documents because the paper documents are stored in storage and requiring labor to obtain technical information to be obtained because pages of the paper documents need to be turned and checked one after another. Therefore, there is a problem that accumulated technical documents have not been utilized sufficiently.

With respect to the above, in recent years, character information contained in paper documents or the like is converted into electronic files by converting the character information into image data as electronic data by using an optical scanning device or the like, performing optical character recognition (OCR) on the image data, and extracting the character information contained in the image data as character data. It is highly desired that the above-described handwritten technical documents are also converted into electronic files and used for searching and browsing quickly.

The accuracy of character recognition performed on handwritten technical documents is not sufficient with current technology, and research for improving recognition accuracy is being actively conducted. For example, Patent Document 1 discloses a technology that aims to provide a technique for improving search accuracy by reducing search noise. The technology includes a recognition error evaluation unit that determines a possibility of a recognition error occurrence in string search results if a search keyword does not match completely, and includes a process of determining the possibility of the recognition error occurrence. Patent Document 2 discloses a technique for recognizing a character in an original document using an index table, and determines a certainty degree indicating a probability of the presence of the character in a portion of the original document by using a set of two consecutive characters.

PRIOR ART DOCUMENT

Patent Document

[Patent Document 1] Japanese Patent No. 3669626
[Patent Document 2] Japanese Patent No. 5594134

SUMMARY OF THE INVENTION

Problem to be Solved by the Invention

When there are many recognition errors of character information, a problem that a digital search performed on an electronic file obtained by using optical character recognition processing does not generate hits occurs. With respect to the above, searches in a wide range, such as ambiguous searches, can reduce the number of hit misses and improve completeness of searches, but the accuracy of searches is sacrificed. Patent Documents 1 and 2 do not suggest an improvement in the accuracy of searches.

In view of the above circumstances, the present invention is made to solve the problem and aims to prevent detection errors while increasing a hit rate of a keyword search.

Means for Solving the Problem

The present invention has the following configuration.

[1] A document search device including a document search unit configured to search for an input keyword in a document database in which document information including text data is stored, the text data being extracted, by using a character recognition process, from document image data generated by imaging a paper document, a similar keyword selecting unit configured to select a similar keyword in accordance with a degree of similarity to the input keyword, from a group of wildcard strings generated from the input keyword, and cause the document search unit to search for the similar keyword in the document database, and an output unit configured to output a search result obtained by searching for the input keyword in the document database and a search result obtained by searching for the similar keyword in the document database

[2] The document search device as described in [1], further including a non-matched document information group extracting unit configured to extract, from the document database, a non-matched document information group that is a document information group other than the search result obtained by searching for the input keyword, and a string search unit configured to search for the group of the wildcard strings in the non-matched document information group to obtain a group of wildcard strings that exist in the non-matched document information group, wherein the similar keyword selecting unit selects the similar keyword in accordance with the degree of similarity to the input keyword from the group of the wildcard strings that exist in the non-matched document information group

[3] The document search device as described in [1], further including a non-matched document information group extracting unit configured to extract, from the document database, a non-matched document information group that is a document information group other than the search result obtained by searching for the input keyword, wherein the similar keyword selecting unit causes the document search unit to search for the similar keyword in the non-matched document information group, and wherein the output unit outputs the search result obtained by searching for the input keyword in the document database and a search result obtained by searching for the similar keyword in the non-matched document information group

[4] A document search device including a document search unit configured to search for an input keyword in a document database in which document information including text data is stored, the text data being extracted, by using a character recognition process, from document image data generated by imaging a paper document, a non-matched document information group extracting unit configured to extract, from the document database, a non-matched document information group that is a document information group other than a search result obtained by searching for the input keyword, a string search unit configured to search for a wildcard string generated from the input keyword in the non-matched document information group to obtain a group of wildcard strings that exist in the non-matched document information group, a similar keyword selecting unit configured to select a similar keyword in accordance with a degree of similarity to the input keyword, from the group of the wildcard strings that exist in the non-matched document information group, and cause the document search unit to search for the similar keyword in the non-matched document information group, and an output unit configured to output the search result obtained by searching for the input keyword in the document database and a search result obtained by searching for the similar keyword in the non-matched document information group

[5] The document search device as described in any one of [1] to [4], further including a degree of similarity obtaining unit configured to obtain, by referring to a keyword database in which a group including a specific field keyword is stored, with respect to each string included in the group of the wildcard strings, a degree of similarity to the input keyword and a degree of similarity to the specific field keyword, wherein the similar keyword selecting unit selects a string whose degree of similarity to the input keyword is the highest among strings included in the group of the wildcard strings or among strings included in a group of wildcard strings that exist in a non-matched document information group, as the similar keyword

[6] The document search device as described in any one of [2] to [5], further including a condition determining unit configured to determine whether degrees of similarity of said strings selected as the similar keyword satisfy a predetermined condition, wherein the similar keyword selecting unit selects a string whose degree of similarity satisfies the predetermined condition as a highly similar keyword among the selected strings, in a case where degrees of similarity of all the selected strings do not satisfy the predetermined condition, wherein the document search unit searches for the highly similar keyword in the non-matched document information group, and wherein the output unit outputs a search result obtained by searching for the highly similar keyword

[7] The document search device as described in any one of [2] to [5], further including a dissimilar keyword selecting unit configured to select a string whose degree of similarity to the input keyword is higher than or equal to a predetermined threshold among strings whose degrees of similarity to the input keyword are not the highest, among strings included in the group of the wildcard strings or among strings included in the group of the wildcard strings that exist in the non-matched document information group, as a dissimilar keyword, wherein the document search unit searches for the dissimilar keyword in the non-matched document information group, and wherein the output unit outputs a search result obtained by searching for the dissimilar keyword together with the search result obtained by searching for the input keyword and the search result obtained by searching for the similar keyword

[8] The document search device as described in any one of [1] to [5], wherein the output unit displays document information of the search result obtained by searching for the input keyword and document information of the search result obtained by searching for the similar keyword as a list on a terminal device

[9] The document search device as described in [6], wherein the output unit displays document information of the search result obtained by searching for the input keyword and document information of the search result obtained by searching for the highly similar keyword as a list on a terminal device

[10] The document search device as described in [7], wherein the output unit displays document information of the search result obtained by searching for the dissimilar keyword together with document information of the search result obtained by searching for the input keyword and document information of the search result obtained by searching for the similar keyword as a list on a terminal device

[11] The document search device as described in any one of [8] to [10], wherein the text data corresponds to identification information that identifies the document image data in the document information, and wherein the output unit accepts a selection of the document information in the list and displays the document image data corresponding to the identification information of the selected document information together with the list, by referring to a document image database in which the document image data is stored in association with the identification information of the document image data

[12] A document search program for causing a computer to execute a process including a document search process of searching for an input keyword in a document database in which document information including text data is stored, the text data being extracted, by using a character recognition process, from document image data generated by imaging a paper document, a document information group extracting process of extracting, from the document database, a non-matched document information group that is a document information group other than a search result obtained by searching for the input keyword, a string search process of searching for a wildcard string generated from the input keyword in the non-matched document information group to obtain a group of wildcard strings that exist in the non-matched document information group, a similar keyword selecting process of selecting a similar keyword in accordance with a degree of similarity to the input keyword from the group of the wildcard strings that exist in the non-matched document information group and searching for the similar keyword in the non-matched document information group by using the document search process, and an output process of outputting the search result obtained by searching for the input keyword in the document database and a search result obtained by searching for the similar keyword in the non-matched document information group

[13] A document search method performed by a computer, including a document search step of searching for an input keyword in a document database in which document information including text data is stored, the text data being extracted by using a character recognition process from document image data generated by imaging a paper document, a document information group extracting step of extracting, from the document database, a non-matched document information group that is a document information group other than a search result obtained by searching for the input keyword, a string search step of searching for a wildcard string generated from the input keyword in the non-matched document information group to obtain a group of wildcard strings that exist in the non-matched document information group, a similar keyword selecting step of selecting a similar keyword in accordance with a degree of similarity to the input keyword from the group of the wildcard strings that exist in the non-matched document information group and searching for the similar keyword in the non-matched document information group at the document search step, and an output step of outputting the search result obtained by searching for the input keyword in the document database and a search result obtained by searching for the similar keyword in the non-matched document information group Effect of the Invention Detection errors can be prevented while increasing a hit rate of a keyword search.

BRIEF DESCRIPTION OF THE DRAWINGS

FIG. 3 is a drawing illustrating an example of a document image database according to the first embodiment;

FIG. 8 is a drawing illustrating selection of a similar keyword in the first embodiment;

FIG. 9 is a first drawing illustrating a display example of a list of document IDs according to the first embodiment;

FIG. 10 is a second drawing illustrating a display example of a list of the document IDs according to the first embodiment;

FIG. 12B is a second flowchart illustrating operations of the document search device according to the second embodiment;

FIG. 13 is a second drawing illustrating a display example of a list of document IDs according to the second embodiment;

EMBODIMENT FOR CARRYING OUT THE INVENTION

Figure 1:
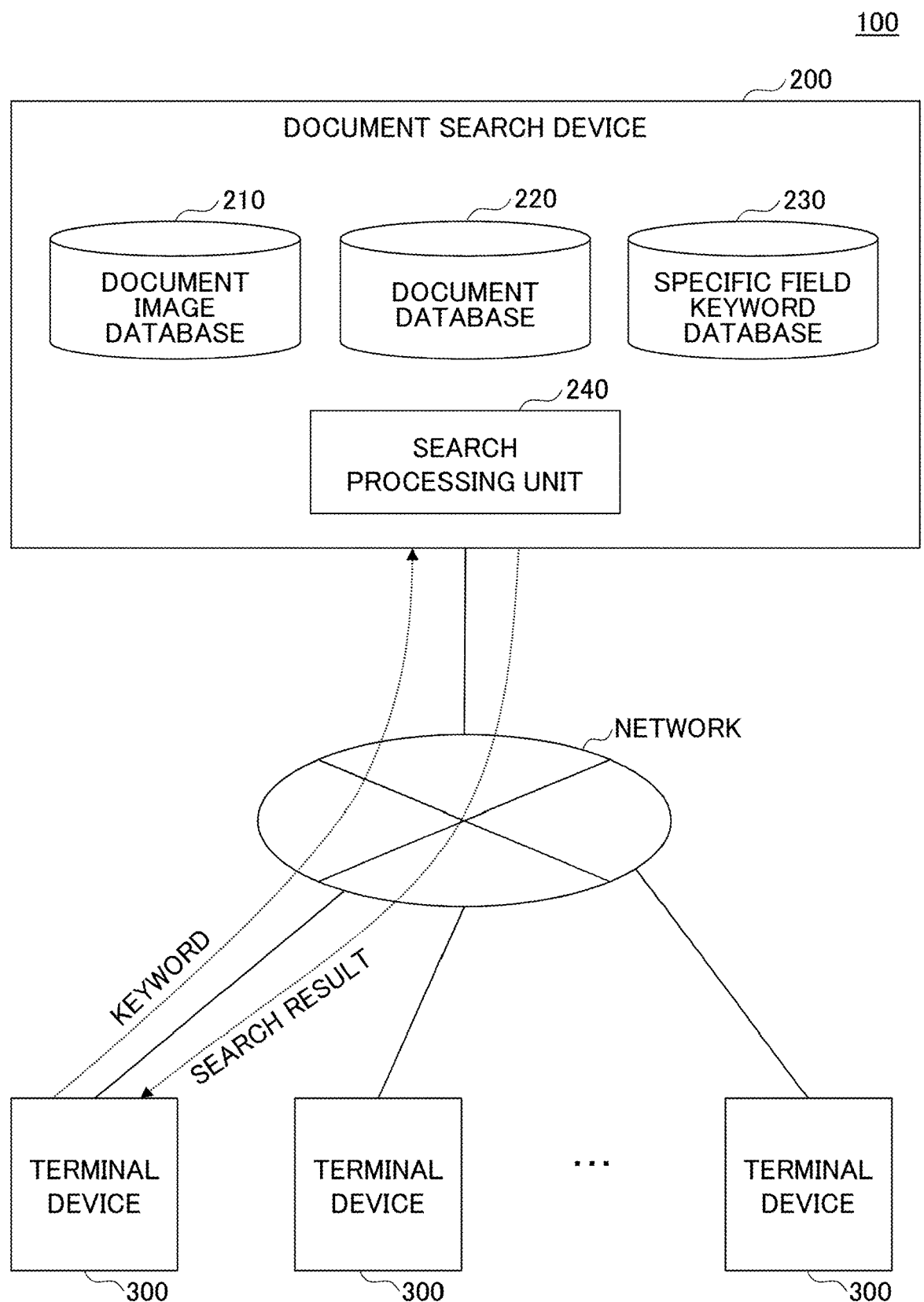
FIG. 1 is a drawing illustrating an example of a system configuration of a document search system according to a first embodiment.

A document search device of the present invention includes a document search unit, a similar keyword selecting unit, and an output unit. In response to an input keyword being input, the document search unit searches for the input keyword in a document database in which document information is stored, the document information including text data extracted by using a character recognition process from document image data obtained by imaging a paper document. The similar keyword selecting unit selects a similar keyword from a wildcard string group consisting of wildcard strings generated from the input keyword in accordance with the degree of similarity to the input keyword, and causes the document search unit to search for the similar keyword in the document database. The output unit outputs a search result obtained by searching for the input keyword in the document database and a search result obtained by searching for the similar keyword in the document database.

The document search device of the present invention may further include a non-matched document information group extracting unit. The non-matched document information group extracting unit extracts, from the document database, a non-matched document information group that is a document information group other than document information that is the search result obtained by searching for the input keyword. In this case, the similar keyword selecting unit may select a similar keyword from among a group of wildcard strings that exist in the non-matched document information group in accordance with the degree of similarity to the input keyword.

Further, in this case, by searching for the selected similar keyword in the document information group that is the search result obtained by searching for the input keyword, when a list of the search result, which will be described later, is displayed, in documents included in the document information group that is the search result obtained by searching for the input keyword, in addition to positions of the input keyword, positions of strings that are recognized as the similar keyword by the character recognition process can be displayed by highlighting or the like, which is preferable.

If the document search device of the present invention includes the non-matched document information group extracting unit, the similar keyword selecting unit may cause the document search unit to search for the similar keyword in the non-matched document information group. In this case, the output unit outputs a search result obtained by searching for the input keyword in the document database and a search result obtained by searching for the similar keyword in the non-matched document information group.

As an embodiment of the document search device of the present invention, a similar keyword can be selected in accordance with the degree of similarity to the input keyword from among the group of the wildcard strings that exist in the above-described non-matched document information group, and the document search unit can search for the similar keyword in the non-matched document information group. In this case, the output unit outputs a search result obtained by searching for the input keyword in the document database and a search result obtained by searching for the similar keyword in the non-matched document information group.

In the following, the present invention will be described in more detail with reference to examples.

First Embodiment

In the following, a first embodiment will be described with reference to the drawings. FIG. 1 is a drawing illustrating an example of a system configuration of a document search system according to a first embodiment.

A document search system 100 of the present embodiment includes a document search device 200. The document search system 100 further includes a terminal device 300, and the document search device 200 and the terminal device 300 may be connected through a network. The terminal device 300 includes an input device, such as a keyboard, and an output device, such as a liquid crystal display, in addition to a communication interface device and the like.

The document search device 200 of the present embodiment includes a document image database 210, a document database 220, a specific field keyword database 230, and a search processing unit 240.

The document image database 210 stores image data obtained by scanning paper documents by using an optical scanning device or the like. Here, the paper documents are, for example, paper documents written by hand or the like. The handwritten paper documents include technical documents about specific technical fields that include notebooks for record keeping, reports, and the like that are written by hand on paper media, design drawings, photographs, and the like that include handwritten character information, and measurement record paper and the like to which handwritten character information is added. The paper documents are also paper documents printed with movable type or the like. The paper documents printed with movable type include technical documents in specific technical fields that include reports, design drawings, and the like that are printed on paper media with movable type. As target paper documents, handwritten paper documents and paper documents printed with movable type may both be present. The document database 220 stores document information including character information obtained by performing an optical character recognition (OCR) process on the image data stored in the document image database 210. The specific field keyword database 230 stores a keyword group in a specific field. If the paper document is a technical document in a specific technical field, the specific field keyword database 230 stores a keyword group related to the specific technical field. Here, the "paper medium" described above includes not only paper, but also plastic films, clothes, plates, hides, walls, and the like.

The document image database 210, the document database 220, and the specific field keyword database 230 of the present embodiment are prepared in advance.

In response to receiving an input of a keyword from the terminal device 300 or an input device 24, which will be described later, the search processing unit 240 according to the present embodiment searches in the document database 220 and identifies a document information group A consisting of document infoimation including the input keyword as a search result. In the following description, the keyword input to the document search device 200 is referred to as the input keyword.

The search processing unit 240 according to the present embodiment identifies a document information group notA (which will be hereinafter also referred to as a non-matched document information group) other than the document information group that is the search result obtained from the document database 220 by searching for the input keyword. Next, the search processing unit 240 obtains a similar keyword that is similar to the input keyword from the identified document information group notA, each keyword stored in the specific field keyword database 230, and the input keyword, and searches for the obtained similar keyword in the non-matched document information group notA.

The search processing unit 240 outputs, to the terminal device 300, the document information group A as a search result obtained by searching for the input keyword in the document database 220 and a document information group A' as a search result obtained by searching for the similar keyword in the non-matched document information group notA.

As described above, according to the present embodiment, after searching for the input keyword, a search in the non-matched document information group notA is performed again by using the similar keyword obtained by referring to the non-matched document information group notA.

Thus, in the present embodiment, for example, in the document information stored in the document database 220, even if a word matching the input keyword is incorrectly identified during the OCR process, there is a possibility that a document is extracted from the non-matched document information group by searching for the similar keyword.

Therefore, according to the present embodiment, detection errors can be prevented while increasing a hit rate of a keyword search.

In the example of FIG. 1, the document image database 210, the document database 220, and the specific field keyword database 230 are provided in the document search device 200, but the example is not limited to this. Each of the document image database 210, the document database 220, and the specific field keyword database 230 may be provided in an external device that can communicate with the document search device 200. Some of the document image database 210, the document database 220, and the specific field keyword database 230 may be provided in the document search device 200.

Figure 2:
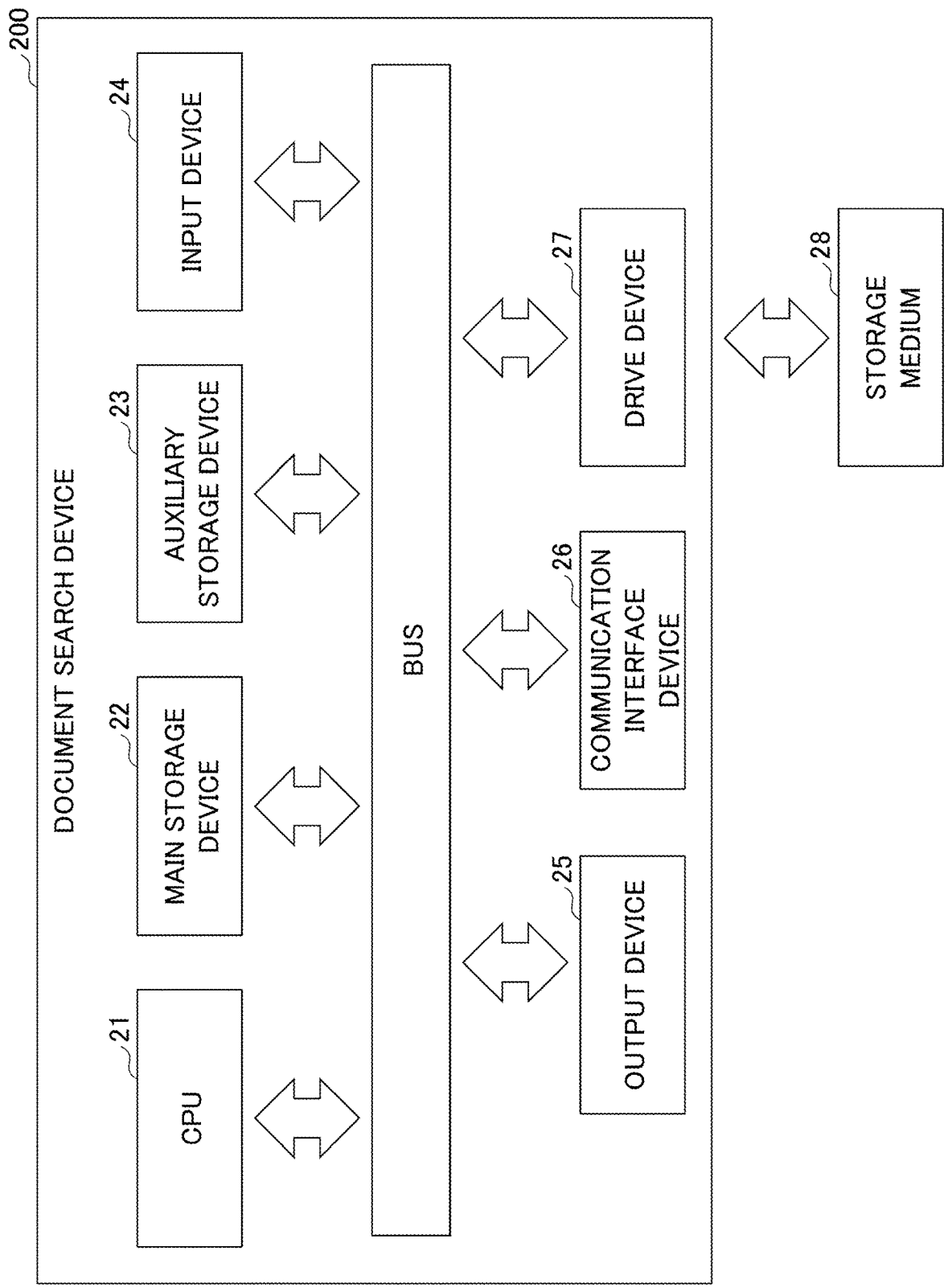
FIG. 2 is a drawing illustrating a hardware configuration of a document search device according to the first embodiment.

Next, with reference to FIG. 2, a hardware configuration of the document search device 200 according to the present embodiment will be described. FIG. 2 is a drawing illustrating the hardware configuration of the document search device according to the first embodiment.

The document search device 200 according to the present embodiment is a device that includes an image input device and a computer and that treats document information. In other words, the document search device 200 according to the present embodiment includes a central processing unit (CPU) 21, a main storage device 22, an auxiliary storage device 23, an input device 24, an output device 25, a communication interface device 26, and a drive device 27, and is an information processing device in which each element is connected with one another through a bus.

The CPU 21 is a main controller that controls an operation of the document search device 200. A document search program stored in the main storage device 22 is read and executed, so that various functions described later are achieved.

Upon a start of the document search device 200, the main storage device 22 reads the document search program from the auxiliary storage device 23 and stores the document search program. The auxiliary storage device 23 stores the installed document search program and necessary files, data, and the like, such as each database described above.

The input device 24 is a device for inputting various types of information and is implemented by, for example, a keyboard, a pointing device, or the like. The output device 25 is for outputting various types of information and is implemented by, for example, a display or the like. The communication interface device 26 includes a LAN card or the like and is used to connect to a network.

The document search program implementing the search processing unit 240 according to the present embodiment is at least a part of various programs controlling the document search device 200. The document search program is provided, for example, by distribution of a storage medium 28 or being downloaded from a network. The storage medium 28 in which the document search program is recorded may be various types of storage media, such as a recording medium that optically, electrically, or magnetically records information, such as a CD-ROM, a flexible disk, a magneto-optical disk or the like, or a semiconductor memory that electrically records information, such as a ROM, a flash memory, or the like.

The document search program is installed in the auxiliary storage device 23 from the storage medium 28 through the drive device 27 when the storage medium 28 recording the document search program is set in the drive device 27. The document search program downloaded from the network is installed in the auxiliary storage device 23 through the communication interface device 26.

Next, with reference to FIGS. 3 to 5, each database according to the present embodiment will be described. Each database according to the present embodiment may be provided in a storage area such as the auxiliary storage device 23, for example.

FIG. 3 is a drawing illustrating an example of the document image database according to the first embodiment. The document image database 210 according to the present embodiment has a document ID, a document name, and document image data as information items, and the item "document ID" is associated with the other items.

A value of the item "document ID" is identification information to identify a document file. The value of the item "document ID" of the present embodiment may consist of, for example, date information indicating when a handwritten document image has been created or a branch number attached to the date information.

A value of the item "document name" indicates a document name. A value of the item "document image data" is image data obtained by scanning a paper document with an optical scanning device. The document image data of the present embodiment may be stored, for example, as a pdf file or as image data.

In the following description, in the document image database 210, information including the value of the item "document ID" and the values of the other items is referred to as document image information.

The document image database 210 may include an item other than the items illustrated in FIG. 3. Specifically, for example, the date on which the document image information is stored in the document image database 210, a name of a person in charge who has performed processing of storing the document image information, and the like may be included as items of the document image database 210.

Figure 4:
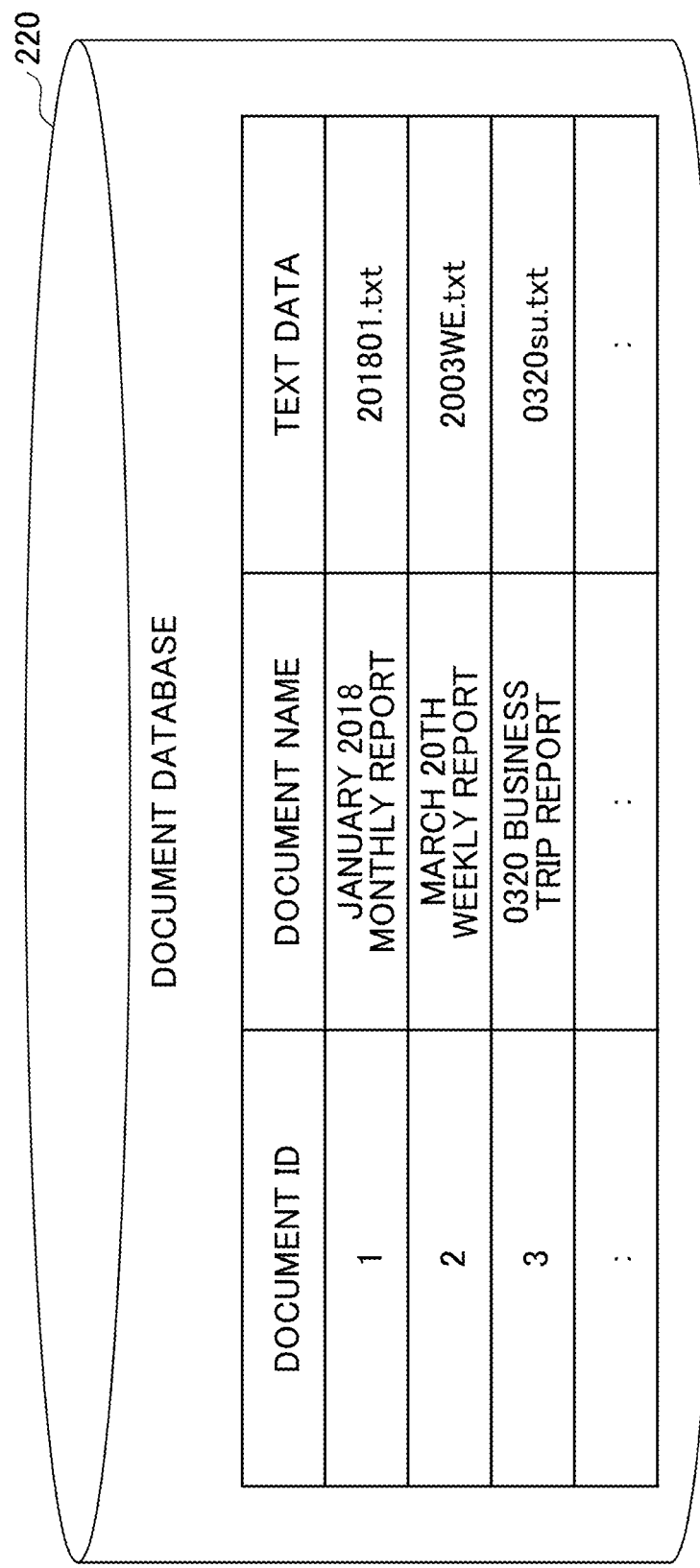
FIG. 4 is a drawing illustrating an example of a document database according to the first embodiment.

FIG. 4 is a drawing illustrating an example of the document database according to the first embodiment. The document database 220 according to the present embodiment includes the document ID, the document name, and text data as information items, and the item "document ID" is associated with the other items.

Because a value of the item "document ID" and a value of the item "document name" are substantially the same as the values in the document image database 210, the description is omitted.

In the following description, in the document database 220, information including the value of the item "document ID" and the values of the other items is referred to as document information.

A value of the item "text data" indicates text data obtained by performing an OCR process on document image data identified by a corresponding document ID in the document image database 210 as a result.

In the example illustrated in FIG. 4, the document ID corresponding to the text data "201801.txt" is "1". Thus, it can be found that the text data "201801.txt" is character information extracted by the OCR process from the document image data "201801.pdf" associated with the document ID "1" in the document image database 210.

Figure 5:
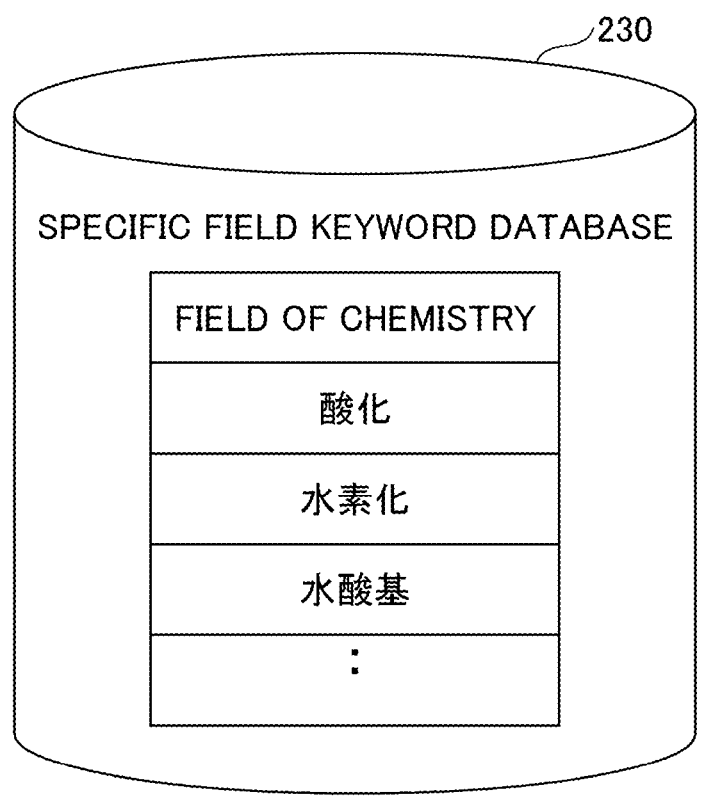
FIG. 5 is a drawing illustrating an example of a specific field keyword database according to the first embodiment.

FIG. 5 is a drawing illustrating an example of the specific field keyword database according to the first embodiment. The specific field keyword database 230 according to the present embodiment stores specific field keywords in advance.

A specific field may be, for example, a technical field corresponding to a content of the document image data stored in the document image database 210. The specific field keyword database 230 may be provided for each of multiple technical fields.

In the example illustrated in FIG. 5, keywords "酸化" representing "oxidation" (i.e., two kanjis representing "acid" and "transform"), "水素化" representing "hydrogenation" (i.e., three kanjis representing "water", "element", and "transform"), "水酸基" representing "hydroxyl group" (i.e., three kanjis representing "water", "acid", and "base"), and the like are stored as keywords in a field of chemistry.

Figure 6:
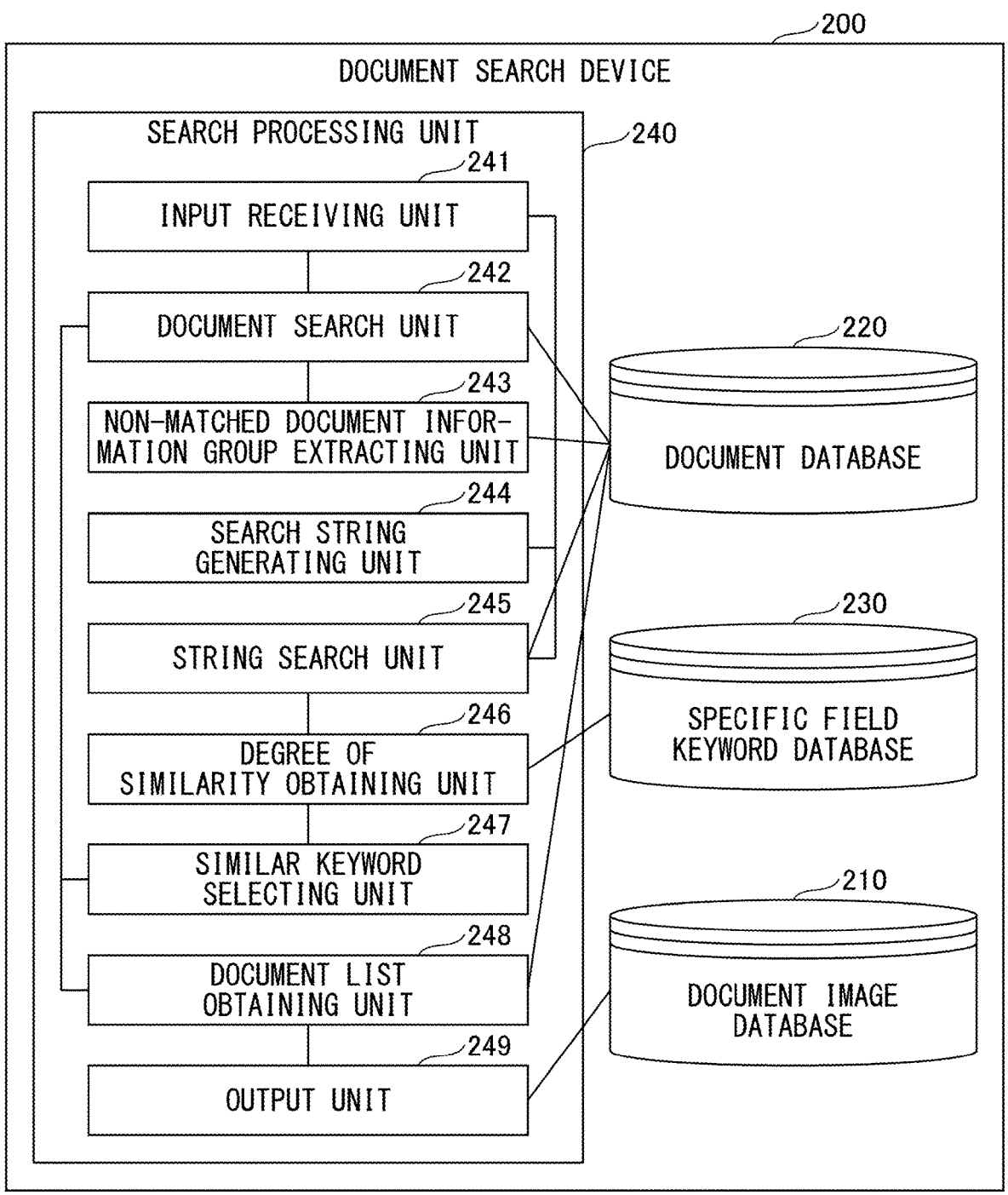
FIG. 6 is a drawing illustrating a function of the document search device according to the first embodiment.

Next, with reference to FIG. 6, a function of the document search device 200 according to the present embodiment will be described. FIG. 6 is a drawing illustrating the function of the document search device according to the first embodiment.

The document search device 200 according to the present embodiment achieves a function of each unit, which is described later, by the CPU 21 reading the document search program stored in the auxiliary storage device 23 and executing the document search program.

The search processing unit 240 of the document search device 200 according to the present embodiment includes an input receiving unit 241, a document search unit 242, a non-matched document information group extracting unit 243, a search string generating unit 244, a string search unit 245, a degree of similarity obtaining unit 246, a similar keyword selecting unit 247, a document list obtaining unit 248, and an output unit 249.

The input receiving unit 241 receives an input that is input to the document search device 200. Specifically, the input receiving unit 241 receives an input of an input keyword from the input device 24 described above.

In response to receiving the input keyword, the document search unit 242 searches for the input keyword in the document database 220 and identifies the document information group A including the input keyword in the text data.

The document search unit 242 searches for a similar keyword selected by the similar keyword selecting unit 247 in the document information group notA that does not include the input keyword (i.e., the non-matched document information group) and identifies document information including the similar keyword in the text data. In other words, the similar keyword selecting unit 247 causes the document search unit 242 to search for the selected similar keyword in the non-matched document information group notA.

The non-matched document information group extracting unit 243 extracts the non-matched document information group notA other than the document information group A identified by the search of the document search unit 242 in the document database 220.

The search string generating unit 244 generates multiple patterns of a string in which one or more characters in characters included in the input keyword are changed to any characters.

Specifically, for example, if the input keyword is "水酸化" representing "hydroxylation" (i.e., three kanjis representing "water", "acid", and "transform"), the search string generating unit 244 generates search strings, such as "○酸化", "水○化", "水酸○", "○○化", "水○○", "○酸○" (here, "○" indicates any character) from "水酸化" representing "hydroxylation" (i.e., three kanjis representing "water", "acid", and "transform"). In the search string generating unit 244, the number of characters to be any characters is a number obtained by decreasing the number of the characters of the input keyword by one at most. That is, the search string contains at least one of the characters included in the input keyword. In the following description, a search string generated by the search string generating unit 244 is referred to as a wildcard string. A string group consisting of these wildcard strings generated from the input keyword is referred to as a wildcard string group. In Japanese, a string in which a character of the input keyword is replaced with an old kanji character, a variant kanji character, an abbreviated kanji character, or the like may be a wildcard string.

The string search unit 245 searches for the wildcard string in the document database to obtain a hit wildcard string group (i.e., a word group). Additionally, the string search unit 245 may search for the wildcard string in the document information group notA extracted by the non-matched document information group extracting unit 243 to obtain the hit wildcard string group (i.e., the word group).

The hit wildcard string group is a group of wildcard strings that exist in the non-matched document information group. The following description assumes that the string search unit 245 searches for the wildcard string in the non-matched document information group notA extracted by the non-matched document information group extracting unit 243 to obtain the hit wildcard string group (i.e., the word group).

The degree of similarity obtaining unit 246 obtains the degree of similarity to the input keyword and the degree of similarity to each keyword stored in the specific field keyword database 230 for respective wildcard strings included in the hit wildcard string group obtained by the search performed by the string search unit 245.

In other words, the degree of similarity obtaining unit 246 obtains, for each of the wildcard strings that exist in the non-matched document information group notA that is obtained by the search performed by the string search unit 245, the degree of similarity obtained as a result of comparing the string representing the input keyword and the degree of similarity obtained as a result of comparing the string representing the keyword stored in the specific field keyword database 230.

The degree of similarity between each of the wildcard strings included in the string group obtained by the search performed by the string search unit 245 and the input keyword and the degree of similarity between each of the wildcard strings included in the string group obtained by the search performed by the string search unit 245 and the specific field keyword are respectively obtained. Various methods can be considered to determine the degree of similarity. The simplest method is to determine based on the number of matching characters. Additionally, matching the order of characters, matching a radical of a kanji, machine learning, or deep learning may be used to determine the degree of similarity. FIG. 8 illustrates an example of determining the degree of similarity.

The similar keyword selecting unit 247 compares the degree of similarity to the input keyword and the degree of similarity to the keyword stored in the specific field keyword database 230 with respect to each of the wildcard strings obtained by the string search unit 245 and selects the wildcard string as a similar keyword if the degree of similarity to the input keyword is the highest among these degrees of similarity. Multiple similar keywords may be selected. If the degree of similarity to the input keyword is not the highest, the wildcard string is not selected as a similar keyword.

That is, the similar keyword selecting unit 247 identifies a similar keyword that is similar to the input keyword from the group of the wildcard strings that exist in the non-matched document information group notA.

The document list obtaining unit 248 obtains lists of the document information groups A and A' identified by the document search unit 242 from the document database 220. Specifically, the document list obtaining unit 248 may obtain the document IDs as a list of the document information.

The output unit 249 outputs the lists of the document information groups A and A' obtained by the document list obtaining unit 248 to the output device 25. Specifically, the output unit 249 displays the lists of document information (i.e., the document IDs) on the output device 25.

When certain document data is selected in the list of the document information displayed on the output device 25, the output unit 249 obtains document image data corresponding to the document ID included in the selected document information in the document image database 210 and displays the document image data on the output device 25.

Figure 7A:
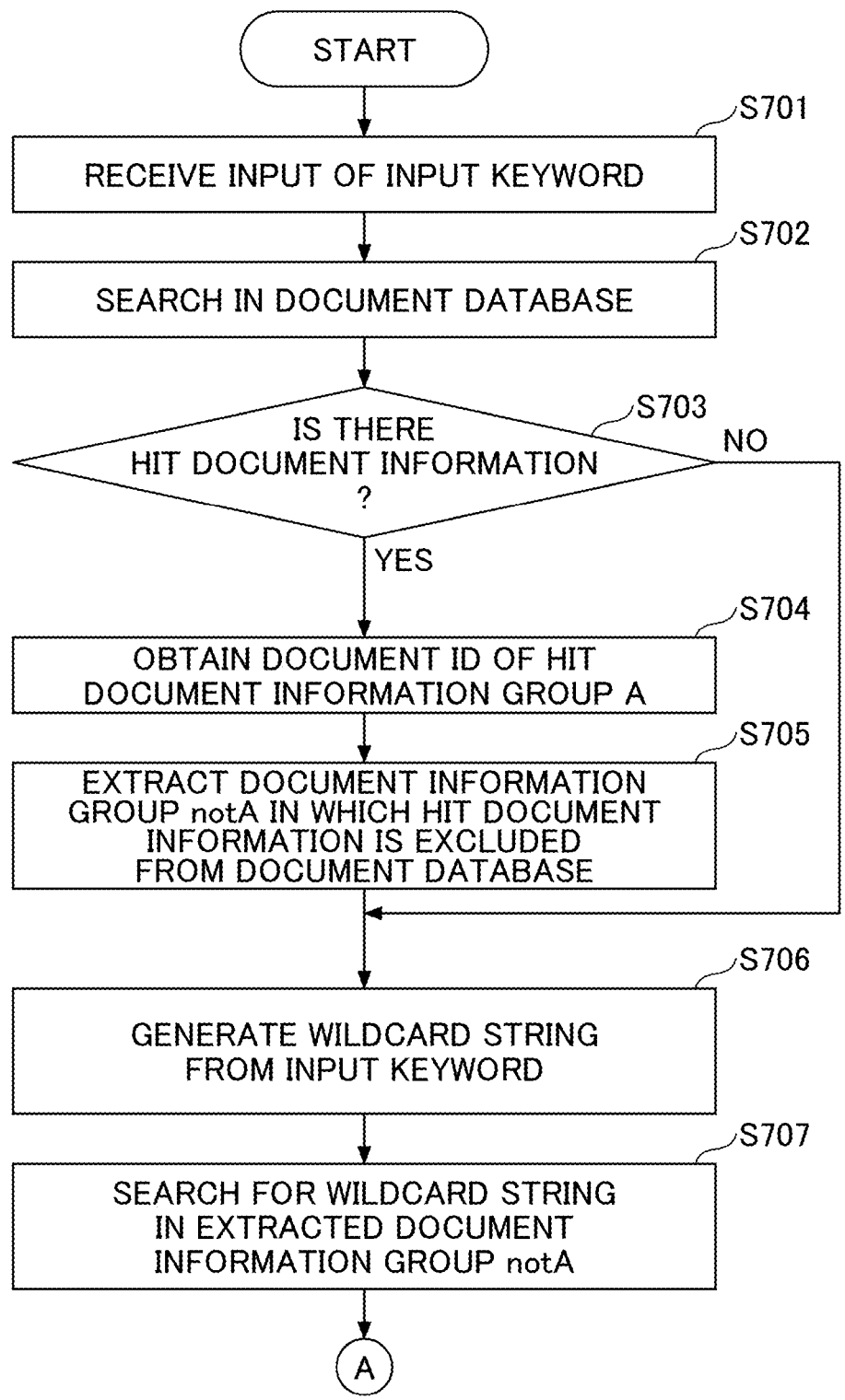
FIG. 7A is a first flowchart illustrating operations of the document search device according to the first embodiment.
Figure 7B:
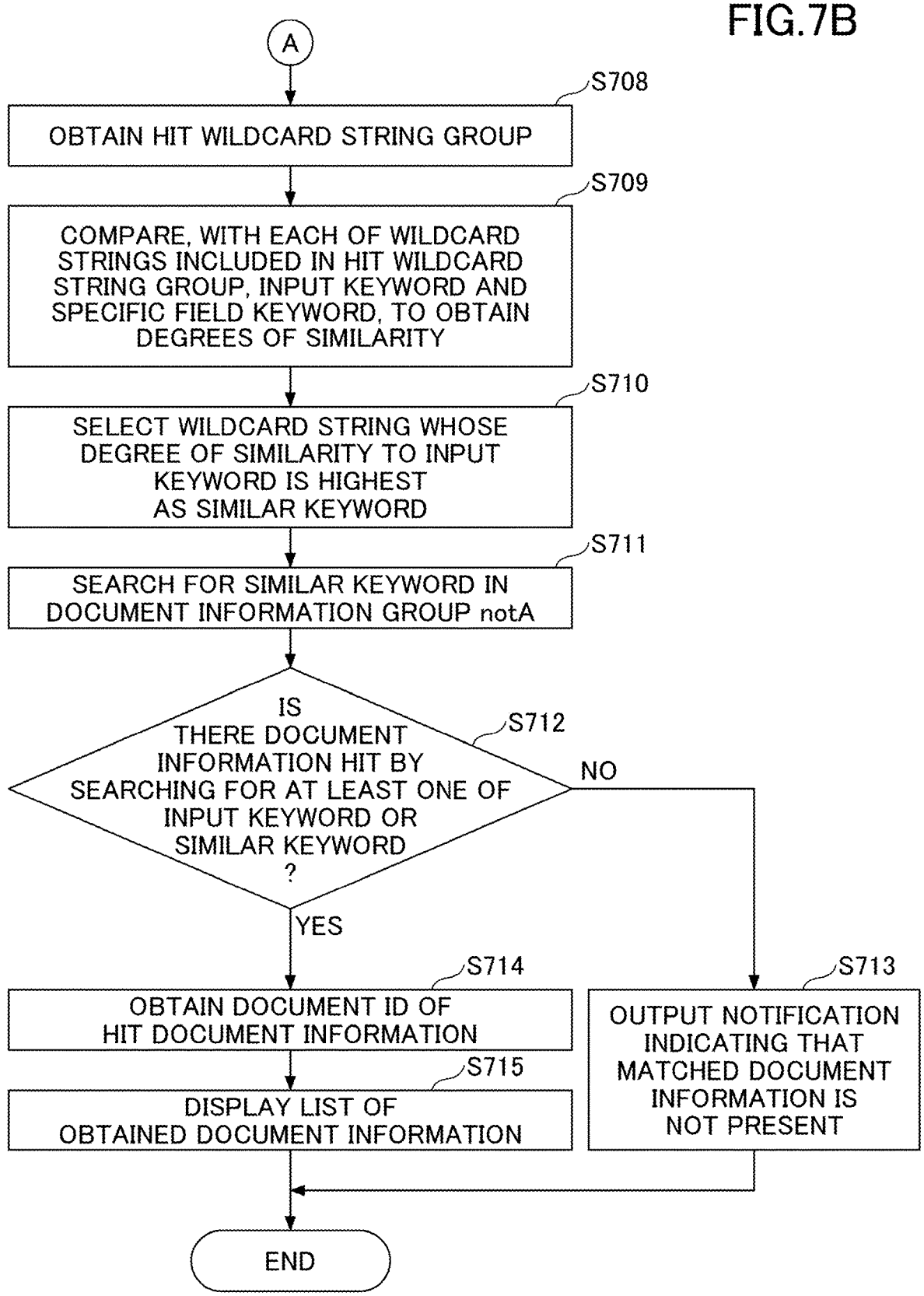
FIG. 7B is a second flowchart illustrating operations of the document search device according to the first embodiment.

Next, with reference to FIG. 7A and FIG. 7B, an operation of the document search device 200 according to the present embodiment will be described. FIG. 7A is a first flowchart illustrating an operation of the document search device according to the first embodiment, and FIG. 7B is a second flowchart illustrating the operation of the document search device according to the first embodiment.

In response to the input receiving unit 241 receiving an input of the input keyword in step S701, the search processing unit 240 of the document search device 200 according to the present embodiment causes the document search unit 242 to search for the input keyword in the document database 220 in step S702.

Subsequently, in step S703, the document search unit 242 determines whether hit document information is present. Specifically, the document search unit 242 determines whether the document information including the input keyword in the text data is stored in the document database 220.

In step S703, if matched document information is not present, the search processing unit 240 proceeds to step S706, which will be described later.

If matched document information is present in step S703, the search processing unit 240 obtains the document ID of the matched document information group A in step S704.

Subsequently, in step S705, the search processing unit 240 extracts the non-matched document information group notA in which the document information whose document ID obtained in step S704 is excluded, from the document database 220 at the non-matched document information group extracting unit 243.

Next, in step S706, the search processing unit 240 generates the wildcard string based on the input keyword at the search string generating unit 244. Here, the search string generating unit 244 may generate wildcard strings of all patterns that can be generated from the input keyword.

Next, in step S707, the search processing unit 240 searches for each of the wildcard strings in the non-matched document information group notA extracted by the non-matched document information group extracting unit 243 at the string search unit 245, and proceeds to step S708 of FIG. 7B.

In FIG. 7B, following step S707, the string search unit 245 obtains a string that is a search result for each of the wildcard strings in step S708. That is, here, the hit wildcard string group, which is a result of searching for each of the wildcard strings in the non-matched document information group notA, is obtained.

Next, in step S709, for each of the hit wildcard strings extracted in step S708, the search processing unit 240 compares the input keyword and compares each keyword stored in the specific field keyword database 230 to obtain the degrees of similarity.

Thus, for each of the wildcard strings included in the hit wildcard string group, the degree of similarity indicating a result of comparing the input keyword and the degree of similarity indicating a result of comparing each keyword stored in the specific field keyword database 230 are obtained.

Subsequently, in step S710, among the wildcard strings included in the hit wildcard string group, the similar keyword selecting unit 247 compares the degree of similarity to the input keyword with the degree of similarity to each keyword stored in the specific field keyword database 230, and selects a wildcard string whose degree of similarity to the input keyword is the highest as a similar keyword of the input keyword. Multiple similar keywords may be selected. The process of step S710 will be described in detail below.

Subsequently, in step S711, the search processing unit 240 searches for the selected similar keyword in the above-described non-matched document information group notA at the document search unit 242.

Next, in step S712, the document search unit 242 determines whether there is document information hit by searching for at least one of the input keyword or the similar keyword. Specifically, the document search unit 242 determines whether document information including a string that matches at least one of the input keywords or the similar keyword in the text data is stored in the document database 220.

If matched document information is not present in step S712, the search processing unit 240 outputs a notification indicating that matched document information is not present to the terminal device 300 at the output unit 249 in step S713 and ends the process.

If matched document information is present in step S712, the document search unit 242 obtains the document ID of the document information in a case where the document information including the string that matches the similar keyword in the text data exists, in step S714.

Subsequently, the search processing unit 240 displays a list of the document IDs obtained in step S704 and step S714 on the output device 25 at the output unit 249 in step S715 and ends the process.

Next, with reference to FIG. 8, a process of selecting the similar keyword will be specifically described. FIG. 8 is a drawing illustrating selection of the similar keyword in the first embodiment.

The example of FIG. 8 indicates a case in which a string of kanjis "水酸化" representing "hydroxylation" (i.e., "water", "acid", and "transform") is input as the input keyword from the input device 24, and in the specific field keyword database 230, a string of kanjis "酸化" representing "oxidation" (i.e., "acid" and "transform"), a string of kanjis "水素化" representing "hydrogenation" (i.e., "water", "element", and "transform"), and a string of kanjis "水酸基", representing "hydroxyl group" (i.e., "water", "acid", and "base") are stored as specific field keywords in addition to the string of kanjis "水酸化" representing "hydroxylation" (i.e., "water", "acid", and "transform").

The example illustrated in FIG. 8 indicates a case in which, as a result of searching for the wildcard string in the document information group, a string of "水変使" (i.e., three kanjis indicating "water", "change", and "use"), a string of "力酸ヒ" (i.e., two kanjis representing "power" and "acid", and one katakana representing "hi"), a string of "秘 酸化" (i.e., three kanjis representing "secret", "acid", and "transform"), a string of "氷酒化" (i.e., three kanjis representing "ice", "alcohol", and "transform"), a string of "水酸可" (i.e., three kanjis representing "water", "acid", and "acceptable"), a string of "水来イ" (i.e., two kanjis representing "water" and "following", and one katakana representing "i"), and a string of "水酒化" (i.e., three kanjis representing "water", "alcohol", and "transform") are obtained as the hit wildcard string group.

Here, the degree of similarity obtaining unit 246 according to the present embodiment compares each of the wildcard strings included in the hit wildcard string group with each of the input keyword and the specific field keyword. That is, the input keyword and the specific field keyword are keywords that are compared with each of the wildcard strings in the hit wildcard string group.

For example, if the kanji characters "水変使" (i.e., "water", "change", and "use") are compared with the kanji characters "水酸化" representing "hydroxylation" (i.e., "water", "acid", and "transforms") that are the input keyword, the kanji character "水" representing "water" matches and a radical of the kanji character "化" representing "transform" matches with a radical of the kanji character "使" representing "use", but the kanji character "変" representing "change" doesn't match the kanji character "酸" representing "acid". Thus, a result of the comparison of these two kanji strings is "O" (the degree of similarity: 33%) indicating that the first characters match, "X" (the degree of similarity: 0%) indicating the second characters do not match, and "Δ" (the degree of similarity: 17%) indicating that radicals of the third characters match. Based on the result of the comparison, the degree of similarity between the kanji characters "水変使" representing "water", "change", and "use" and the kanji characters representing "水酸化" representing "hydroxylation" (i.e., "water", "acid", and "transform") is 50%.

Similarly, in the present embodiment, kanjis "水変 使" representing "water", "change", and "use" and a specific field keyword of two kanjis "酸化" representing "oxidation" (i.e., "acid" and "transform") are compared, the kanjis "水 変使" representing "water", "change", and "use" and a specific field keyword of three kanjis "水素化" representing "hydrogenation" (i.e., "water", "element", and "transform") are compared, the kanjis "水変使" representing "water", "change", and "use" and a specific field keyword of three kanjis "水酸基" representing "hydroxyl group" (i.e., "water", acid", and "base") are compared, and then the degrees of similarity are obtained.

As a result, it is found that a string having the highest degree of similarity to the kanjis "水変使" representing "water", "change", and "use" is the three kanjis "水素化" representing "hydrogenation" (i.e., "water", "acid", and "transform") that are the specific field keyword. Therefore, the string of the kanjis "水変使" representing "water", "change", and "use" is not a string whose degree of similarity to the input keyword is the highest in comparison with the degree of similarity to each keyword stored in the specific field keyword database 230, and is not selected as the similar keyword.

If the string of the kanjis "氷酒化" representing "ice", "alcohol", and "transform" is compared with the string of the kanjis "水酸化" representing "hydroxylation" that is the input keyword, the characters "水" representing "water" and "酸" representing "acid" don't match, but shapes of the kanji characters are similar. Thus, a result of the comparison of these two strings is "Δ" (the degree of similarity: 17%) indicating being similar for the first characters and the second characters, and "O" (the degree of similarity: 33%) for the third characters. Based on the result of the comparison, the degree of similarity between the kanjis "氷酒化" representing "ice", "alcohol", and "transform" and the kanjis "水 酸 化" representing "hydroxylation" (i.e., "water", "acid", and "transform") is 67%.

Similarly, in the present embodiment, the string of kanjis "氷酒化" representing "ice", "alcohol", and "transform" and the specific field keyword of two kanjis "酸 化" representing "oxidation" (i.e., "acid" and "transform") are compared, the string of kanjis "氷酒化" representing "ice", "alcohol", and "transform" and the specific field keyword of three kanjis "酸化" representing "hydrogenation" (i.e., "water", "element", and "transform") are compared, the string of kanjis "氷酒化" representing "ice", "alcohol", and "transform" and the specific field keyword of three kanjis "水酸基" representing "hydroxyl group" (i.e., "water", "acid", and "base") are compared, and then the degrees of similarity are obtained.

As a result, it is found that a string having the highest degree of similarity to the string of kanjis "氷酒化" representing "ice", "alcohol", and "transform" is the string of three kanjis "水酸化" representing "hydrogenation" ("water", "acid", and "transform") that is the input keyword, in comparison with the degree of similarity to each keyword stored in the specific field keyword database 230. Therefore, the string of kanjis "氷酒化" representing "ice", "alcohol", and "transform" is a string whose degree of similarity to the input keyword is the highest, and is selected as the similar keyword.

If the string of kanjis "水酒化" representing "water", "alcohol", and "transform" is compared with the string of kanjis "水酸化" representing "hydrogenation" ("water", "acid", and "transform") that is the input keyword, the kanji character "酸" representing "acid" doesn't match, but shapes of the kanji characters are similar. Thus, a result of the comparison of these two strings is "Δ" (the degree of similarity: 17%) indicating being similar for the second characters, and "O" (the degree of similarity: 33%) for the first characters and the third characters. Based on the result of the comparison, the degree of similarity between the string of kanjis "水酒化" representing "water", "alcohol", and "transform" and the string of kanjis "水酸化" representing "water", "acid", and "transform" is 84% (if the degree of similarity: 33% is for two characters, the total is 67%). Similarly with the above-described string of kanjis "氷酒化" representing "ice", "alcohol", and "transform", it is found that a string having the highest degree of similarity to the string of kanjis "水酒化" representing "water", "alcohol", and "transform" is the string of three kanjis "水酸化" representing "hydrogenation" (i.e., "water", "acid", and "transform") that is the input keyword, in comparison with the degree of similarity to each keyword stored in the specific field keyword database 230. Therefore, the string of kanjis "水酒化" representing "water", "alcohol", and "transform" is a string whose degree of similarity to the input keyword is the highest, and is selected as the similar keyword.

Next, a display example of a list of document IDs in the output device 25 according to the present embodiment will be described. FIG. 9 is a first drawing illustrating the display example of the list of the document IDs according to the first embodiment.

A screen 301 illustrated in FIG. 9 is an example of a screen displayed on the output device 25. A list 302 of the document IDs output by the output unit 249 is displayed in the screen 301.

In the list 302 of the document IDs, information in which the document ID, the document name, and the search keyword used for the search of the document information including the document ID are associated is displayed. In the screen 301, the search keyword displayed in association with the document ID is either the input keyword or the similar keyword.

In the example of FIG. 9, it is found that document information of the document ID "1" and document information of the document ID "3" are document information extracted by the input keyword of the kanjis "水酸化" representing "hydroxylation" (i.e., "water", "acid", and "transform"). In the example of FIG. 9, it is found that document information of the document ID "2" and document information of the document ID "5" are document information extracted by the similar keyword of kanjis "氷酒化" representing "ice", "alcohol", and "transform", and document information of the document ID "11" and document information of the document ID "12" are document information extracted by the similar keyword of kanjis "水酒化" representing "water", "alcohol", and "transform".

In the present embodiment, when document information is selected by a pointer P, a finger of a user of the terminal device 300, or the like in the list 302 of the document IDs, document image data corresponding to the selected document information is displayed.

In FIG. 9, the document ID "1" is selected and document image data 303 associated with the document ID "1" in the document image database 210 is displayed next to the list 302 of the document IDs.

As described above, in the present embodiment, when the document ID is selected in the list of document IDs that are the search results, the document image data corresponding to the selected document ID can be displayed.

FIG. 10 is a second drawing illustrating a display example of a list of the document IDs according to the first embodiment. In a screen 301A illustrated in FIG. 10, a list 302A of document IDs that are the search results of searching for the input keyword and a list 302B of document IDs that are the search results of searching for the similar keyword are separately displayed.

In the list 302A and the list 302B, the document ID and the document name are displayed in association with each other.

In the screen 301A, a message 101 indicating that the list 302A is the search results of searching for the input keyword of kanjis " 水酸化 " representing "hydroxylation" (i.e., "water", "acid", and "transform"), a message 102A indicating that the list 302B is the search results of searching for the similar keyword of kanjis " 氷酒化 " representing "ice", "alcohol", transform", and a message 102B indicating that a list 303B is the search results of searching for the similar keyword of kanjis " 水酒化 " representing "water", "alcohol", and "transform" are displayed.

In addition, messages 95A and 95B are respectively displayed in the list 302B and the list 303B that indicate the degree of similarity between the input keyword and the similar keyword.

As described, in the present embodiment, by displaying the degree of similarity between the similar keyword and the input keyword, the reliability of the search results of searching for the similar keyword can be presented to the user of the terminal device 300.

As described above, according to the present embodiment, the information indicated in the paper document written by handwriting or the like can be easily and quickly used for searching and browsing. Additionally, according to the present embodiment, the similar keyword is derived from the input keyword, and search results based on the similar keyword are displayed together with search results of searching for the input keyword. Therefore, the error detection can be prevented while increasing the hit rate of the keyword search.

Second Embodiment

In the following, with reference to the drawings, a second embodiment will be described. The second embodiment differs from the first embodiment in that a condition is set to the degree of similarity used when selecting a similar keyword. Thus, in the following description of the second embodiment, differences between the first embodiment and the second embodiment are described. Components having functional configurations similar to the first embodiment are referenced by reference numerals similar to the reference numerals used in the description of the first embodiment, and the description thereof is omitted.

Figure 11:
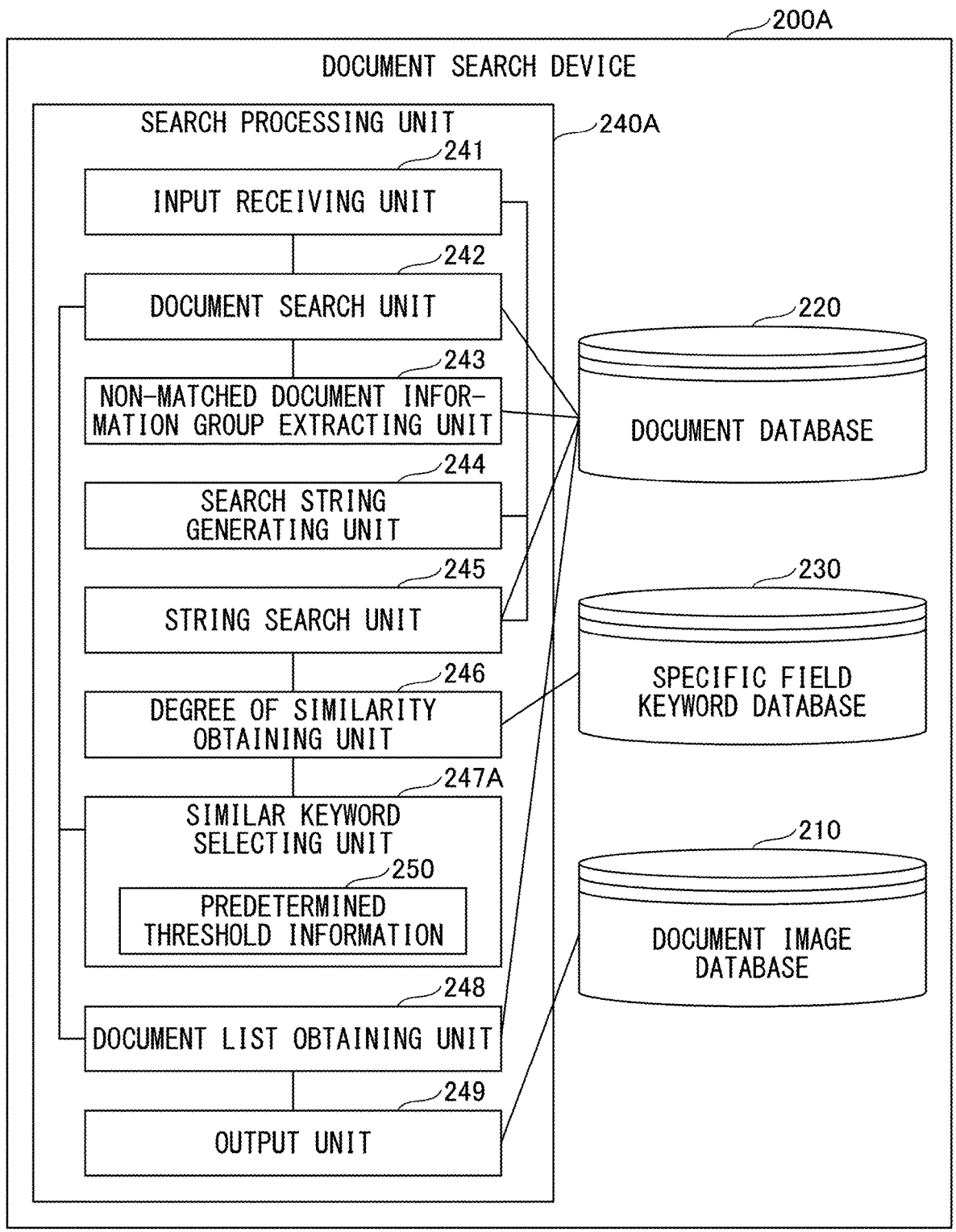
FIG. 11 is a drawing illustrating a function of a document search device according to a second embodiment.

FIG. 11 is a drawing illustrating a function of a document search device according to the second embodiment. A document search device 200A according to the present embodiment includes a search processing unit 240A.

The search processing unit 240A includes predetermined threshold information 250 in a similar keyword selecting unit 247A in addition to the units included in the search processing unit 240 according to the first embodiment.

The predetermined threshold information 250 retained by the similar keyword selecting unit 247A may be set as desired at any timing by a user of the input device 24 and the terminal device 300.

According to the present embodiment, a condition that a string having the degree of similarity to the input keyword that is higher than or equal to a predetermined threshold among similar keywords is used as a highly similar keyword, or the like is set.

If a string having a higher degree of similarity to the input keyword is used as the highly similar keyword, in the document information obtained as the search results, there is a probability that more error detections are reduced. In other words, as the threshold for the degree of similarity to the input keyword is set higher, the accuracy of the hit document information is improved.

As described, in the present embodiment, by allowing the user of the input device 24 and the terminal device 300 to set the predetermined threshold information 250 for selecting the highly similar keyword as desired, search results according to the user's request can be output.

Figure 12A:
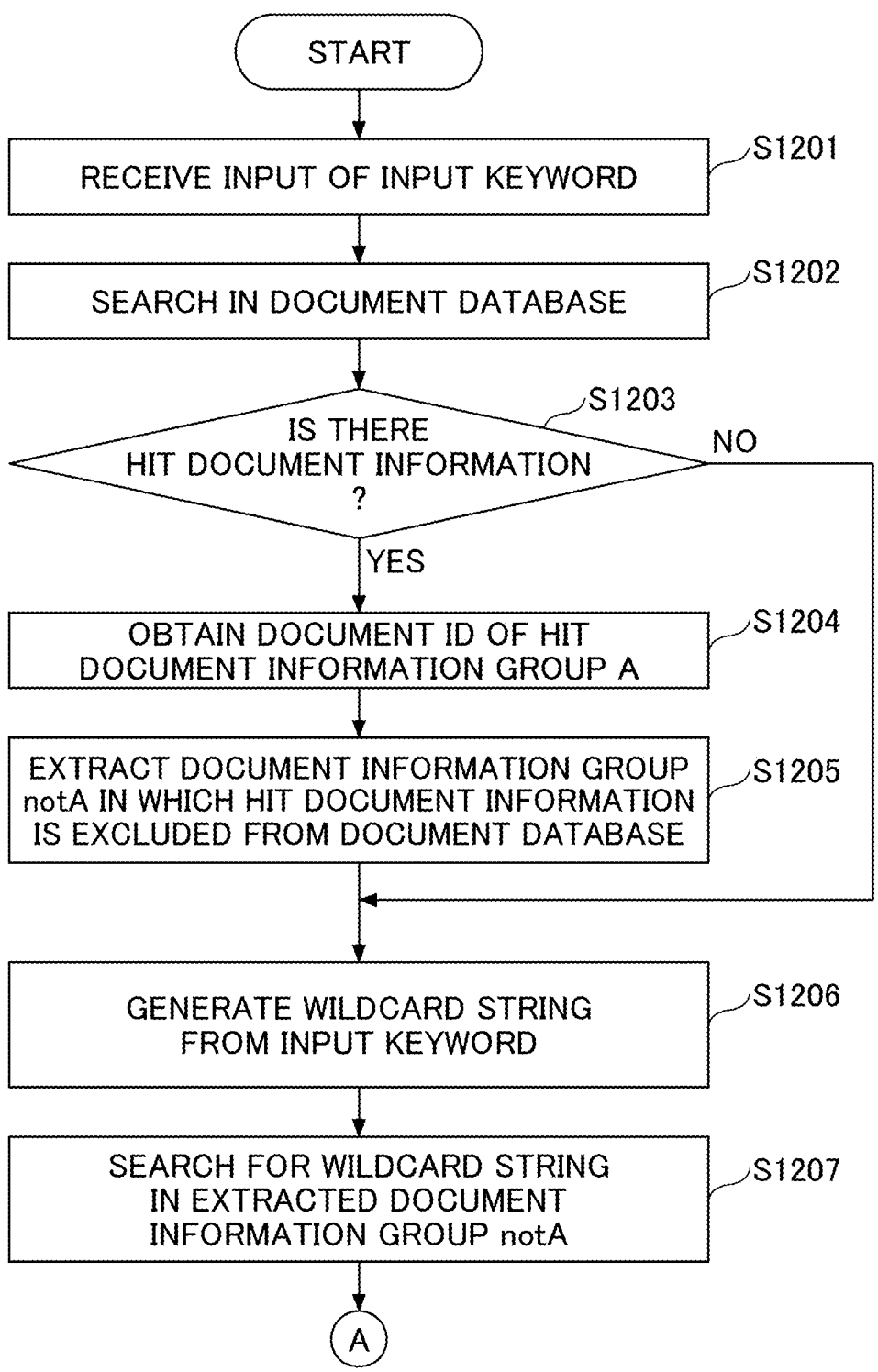
FIG. 12A is a first flowchart illustrating operations of the document search device according to the second embodiment.

In the following, with reference to FIG. 12A and FIG. 12B, an operation of the document search device 200A according to the present embodiment will be described. FIG. 12A is a first flowchart illustrating an operation of the document search device according to the second embodiment, and FIG. 12B is a second flowchart illustrating the operation of the document search device according to the second embodiment.

A process from step S1201 of FIG. 12A to step S1210 of FIG. 12B is substantially the same as the process from step S701 to step S710 of FIG. 7A. Thus, the description will be omitted.

Subsequently to step S1210, in step S1211, the similar keyword selecting unit 247A determines, as a highly similar keyword, a similar keyword having the degree of similarity between a selected similar keyword and the input keyword that is higher than or equal to the predetermined threshold from among the similar keywords.

Here, for example, if the degree of similarity between a string selected from among the strings selected as the similar keyword and the input keyword is 75% and a condition that the degree of similarity is 70% or higher is set, the selected similar keyword is used as the highly similar keyword.

Subsequently, in step S1212, the search processing unit 240A searches for the highly similar keyword in the above-described non-matched document information group notA at the document search unit 242.

Next, in step S1213, the document search unit 242 determines whether there is document information hit by searching for at least one of the input keyword or the highly similar keyword.

A process from step S1214 to step S1216 is substantially the same as the process from step S713 to step S715 of FIG. 7B. Thus, the description thereof will be omitted.

In the following, with reference to FIG. 13, a display example of the terminal device 300 according to the present embodiment will be described. FIG. 13 is a second drawing illustrating a display example of a list of document IDs according to the second embodiment.

In a screen 301B illustrated in FIG. 13, a list 302A of document IDs obtained as search results by searching for the input keyword of kanjis " 水酸化 " representing "hydroxylation" (i.e., "water", "acid", and "transform") is displayed.

In the example of FIG. 13, condition information 98 indicating a condition set to the predetermined threshold information 250 is displayed. According to the condition information 98, it is understood that a condition that a string having "a degree of similarity of 70% or higher" is selected as a highly similar keyword is set in the predetermined threshold information 250.

Additionally, a message 103 indicating that the string of kanjis " 水酒化 " representing "water", "alcohol", and "transform" is selected as the highly similar keyword and a list 302C of document IDs indicating search results obtained by searching for the highly similar keyword of kanjis "水酒化" representing "water", "alcohol", and "transform" is displayed on a screen 301B.

Further, in the list 302C, a message 95C indicating the degree of similarity between the input keyword and the similar keyword is displayed.

Still further, in the present embodiment, an input field 99 for inputting condition information to be retained in the predetermined threshold information 250 and an operation button 104 for instructing an execution of searching again based on the condition set in the input field 99 may be displayed.

For example, in the present embodiment, if a condition that a string having the degree of similarity of 80% or more is used as a highly similar keyword is input to the input field 99 and the operation button 104 is operated, the process may be restarted from step S1210 of FIG. 12B.

As described, according to the present embodiment, searching again can be performed in response to a request of a user of the output device 25 who browses the search results.

Third Embodiment

In the following, with reference to the drawings, a third embodiment will be described. The third embodiment differs from the first embodiment in that among wildcard strings that are not selected as a similar keyword because the degree of similarity to the input keyword is not the highest, a string having the degree of similarity between the input keyword and the wildcard string that is higher than or equal to a predetermined threshold is used as a dissimilar keyword, and a search for each of the input keyword, the similar keyword, and the dissimilar keyword is performed in the document database 220. Thus, in the following description of the third embodiment, differences from the first embodiment are described, and components having functional configurations similar to the first embodiment are referenced by reference numerals similar to the reference numerals used in the description of the first embodiment, and the description thereof is omitted.

Figure 14:
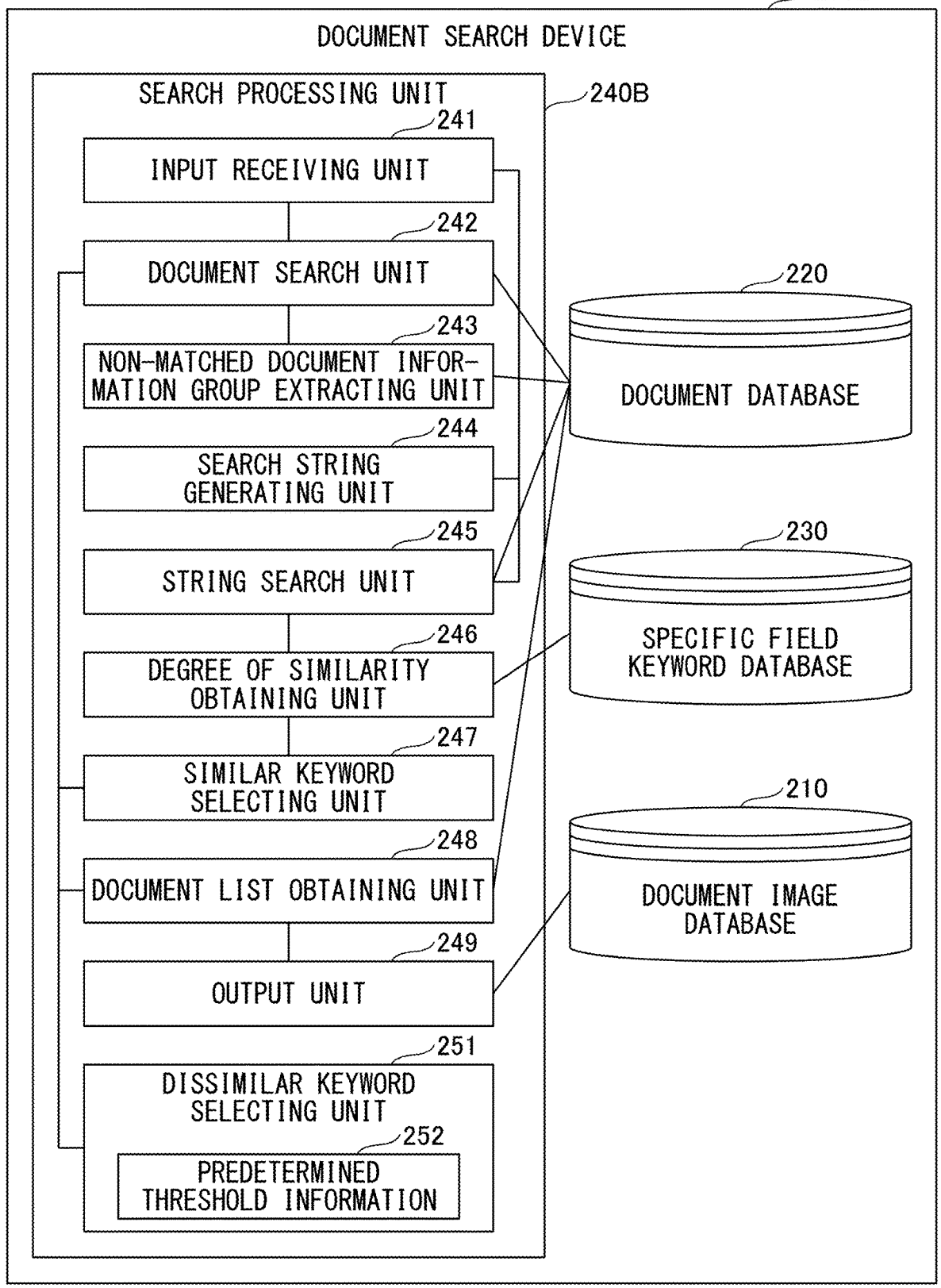
FIG. 14 is a drawing illustrating a function of a document search device according to a third embodiment.

FIG. 14 is a drawing illustrating a function of a document search device according to a third embodiment. A document search device 200B according to the present embodiment includes a search processing unit 240B. The search processing unit 240B according to the present embodiment includes a dissimilar keyword selecting unit 251 that retains predetermined threshold information 252 in addition to the units included in the search processing unit 240 according to the first embodiment.

The dissimilar keyword selecting unit 251 according to the present embodiment selects, as the dissimilar keyword, a string having the degree of similarity to the input keyword that is higher than or equal to a predetermined threshold from among strings whose degrees of similarity to the input keyword are not the highest (i.e., wildcard strings that are not selected as the similar keyword) in respective wildcard strings of the wildcard string group.

Figure 15A:
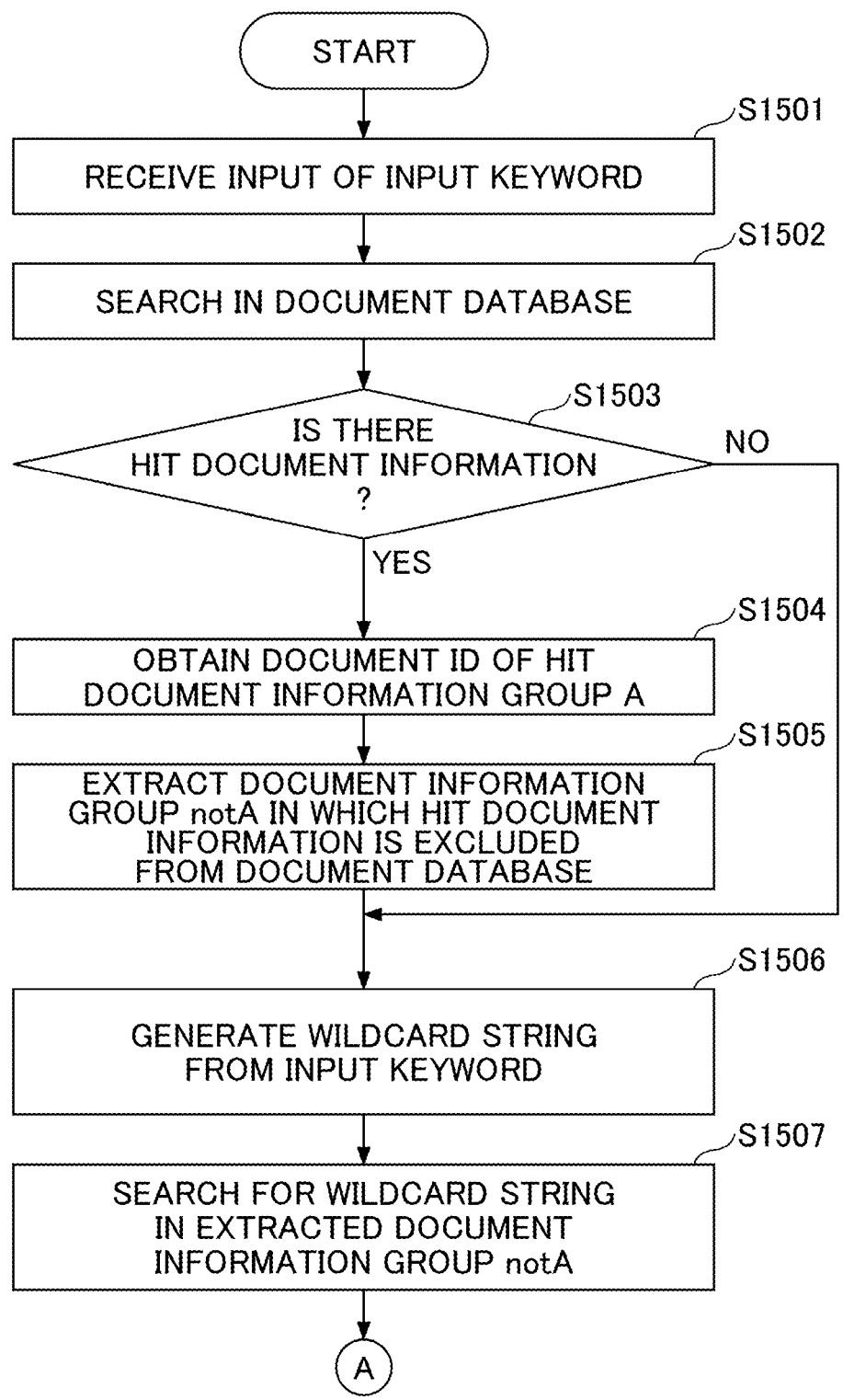
FIG. 15A is a first flowchart illustrating operations of the document search device according to the third embodiment.
Figure 15B:
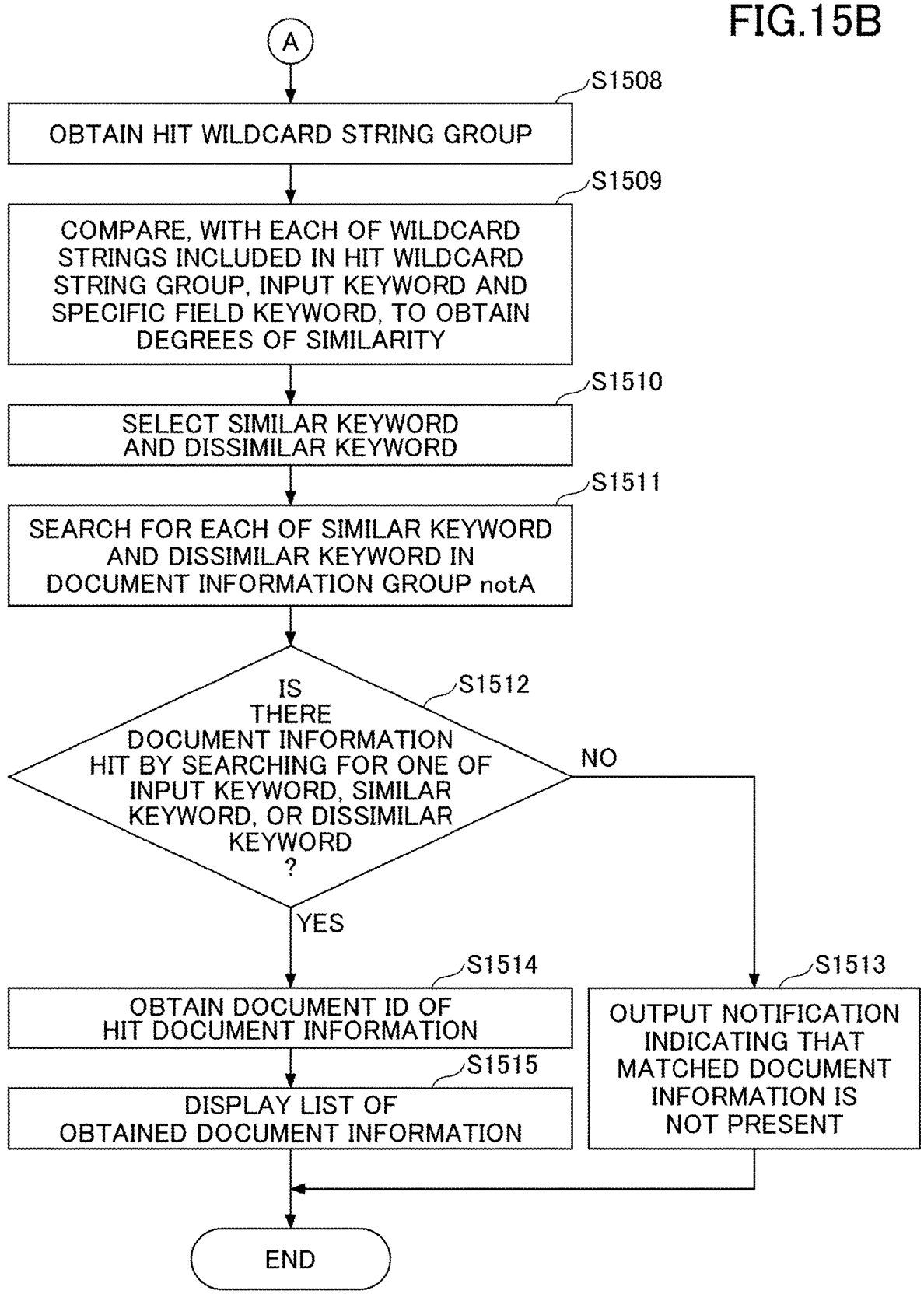
FIG. 15B is a second flowchart illustrating operations of the document search device according to the third embodiment.

FIG. 15A is a first flowchart illustrating an operation of the document search device according to the third embodiment, and FIG. 15B is a second flowchart illustrating the operation of the document search device according to the third embodiment. A process from step S1501 of FIG. 15A to step S1509 of FIG. 15B is substantially the same as the process from step S701 of FIG. 7A to step S709 of FIG. 7B. Thus, the description thereof is omitted.

In step S1509, for each of the wildcard strings, the degree of similarity to the input keyword and the degree of similarity to the specific field keyword are obtained. In step S1510, a similar keyword is selected by the similar keyword selecting unit 247, and a dissimilar keyword is selected by the dissimilar keyword selecting unit 251.

Subsequently, in step S1511, the search processing unit 240B searches for each of the similar keyword and the dissimilar keyword in the non-matched document information group notA, in which the input keyword is not included, at the document search unit 242.

Subsequently, in step S1512, the document search unit 242 determines whether there is document information that matches at least one of the input keyword, the similar keyword, or the dissimilar keyword.

If a wildcard string having a high degree of similarity to the input keyword is selected as the dissimilar keyword, there is a high possibility that document information obtained as the search result contains information less relevant to the input keyword. Thus, in this case, the document information extracted as the search results is less likely to be information highly relevant to the input keyword. Instead, various types of document information may be extracted. In other words, as the threshold for the degree of similarity is lowered, the completeness of hit document information is improved.

A process from step S1513 to step S1515 of FIG. 15B is substantially the same as the process from step S713 to step S715 of FIG. 7B. Thus, the description thereof is omitted.

Figure 16:
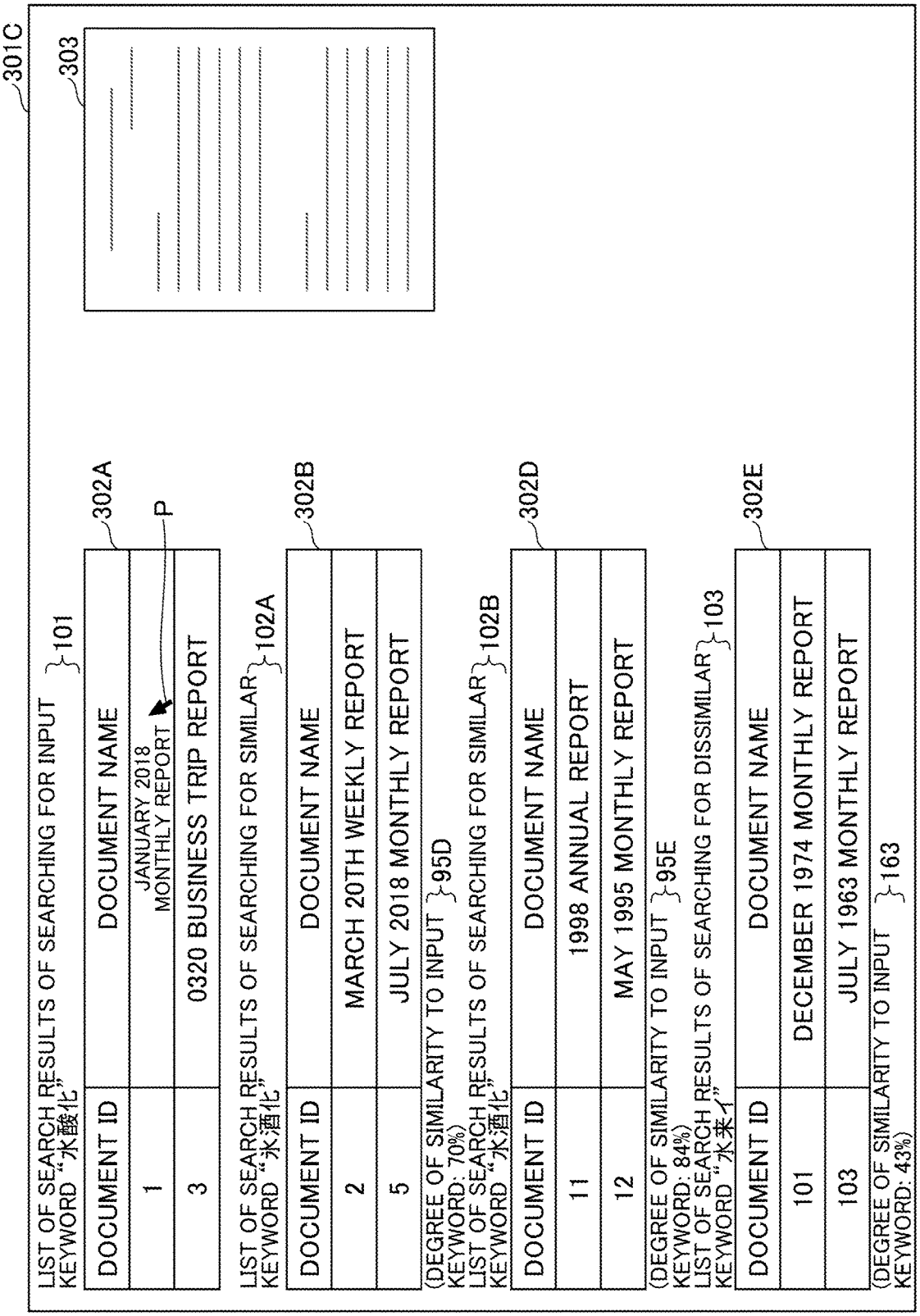
FIG. 16 is a drawing illustrating a display example of a list of document IDs according to the third embodiment.

Next, with reference to FIG. 16, a display example of the present embodiment will be described. FIG. 16 is a drawing illustrating a display example of a list of document IDs according to the third embodiment.

On a screen 301C illustrated in FIG. 16, a list 302A of document IDs that are search results obtained by searching for the input keyword, and a message 101 indicating that the list 302A is search results of searching for the input keyword of kanjis "水酸化" representing "hydroxylation" (i.e., "water", "acid", and "transform") are displayed.

Additionally, on the screen 301C, lists 302B and 302D of document IDs that are search results of searching for the similar keywords, a message 102A and a message 102B that respectively indicate that the list 302B is the search results of searching for the similar keyword of kanjis "氷酒化" representing "ice", "alcohol", and "transform" and that the list 302D is the search results of searching for the similar keyword of kanjis "水酒化" representing "water", "alcohol", and "transform", and messages 95D and 95E that indicate the degree of similarity between the input keyword and the similar keyword are displayed.

Further, on the screen 301C, a list 302E of document IDs that are search results obtained by searching for the dissimilar keyword, a message 103 indicating that the list 302E is search results of searching for the dissimilar keyword "水来イ" representing two kanjis "water" and "following" and one katakana representing "i", and a message 163 indicating the degree of similarity between the input keyword and the dissimilar keyword are displayed.

In the present embodiment, as described, the lists 302B and 302D that are search results of searching for the similar keywords and the list 302E that is the search results of searching for the dissimilar keyword are displayed together. In other words, according to the present embodiment, the search results obtained with prioritizing accuracy and the search result obtained with prioritizing completeness are displayed together.

In the present embodiment, as described, displaying the search results obtained by searching from two different viewpoints enables a user of the terminal device 300 who browses the search results to compare the respective search results.

By enabling a browser to compare the search results, for example, a state of stored paper documents can be grasped.

For example, if, in the search results obtained with prioritizing completeness, there is a large amount of document information of paper documents having older dates when the paper documents have been prepared, in comparison with the search results obtained with prioritizing accuracy, it can be considered, for example, that a state of the paper documents might be poor when the paper documents were converted to document image data, or that a phrase that is currently expressed in a unique way might be expressed in various ways in the past.

For example, if there is a large amount of information of paper documents stored under a particular storage condition in the search results obtained with prioritizing accuracy, it can be considered that a storage state of the paper documents might be well maintained with the storage condition.

As described, the present embodiment can suggest various possibilities of the state of paper documents, fluctuation in expressions, and the like to the browser.

The present invention is not limited to the embodiments disclosed specifically, and various modifications and alterations can be made without departing from the scope of the claims. The present application is based on and claims priority to Japanese Patent Application No. 2018-189438, filed on Oct. 4, 2018, the entire contents of which are hereby incorporated herein by reference.

DESCRIPTION OF THE REFERENCE NUMERALS

- 100 document search system
- 200, 200A, 200B document search device
- 210 document image database
- 220 document database
- 230 specific field keyword database
- 240, 240A, 240B search processing unit
- 241 input receiving unit
- 242 document search unit
- 243 non-matched document information group extracting unit
- 244 search string generating unit
- 245 string search unit
- 246 degree of similarity obtaining unit
- 247 similar keyword selecting unit
- 248 document list obtaining unit
- 249 output unit
- 250 condition determining unit
- 251 dissimilar keyword selecting unit
- 300 terminal device

The invention claimed is:

1. A document search device comprising:
a processor; and
a memory storing program instructions that cause the processor to
search for an input keyword in a document database in which document information including text data is stored, the text data being extracted by using a character recognition process from document image data generated by imaging a paper document;
select a similar keyword in accordance with a degree of similarity to the input keyword from a group of wildcard strings generated from the input keyword and search for the similar keyword in the document database, the degree of similarity being determined by comparing each character of the input keyword with a corresponding character of a wildcard string in the group of wildcard strings; and
output a search result obtained by searching for the input keyword in the document database and a search result obtained by searching for the similar keyword in the document database,
wherein the program instructions cause the processor to further extract, from the document database, a non-matched document information group that is a document information group other than the search result obtained by searching for the input keyword, and
search for the group of the wildcard strings in the non-matched document information group to obtain a group of wildcard strings that exist in the non-matched document information group,
wherein the processor selects the similar keyword in accordance with the degree of similarity to the input keyword from the group of the wildcard strings that exist in the non-matched document information group.

2. The document search device as claimed in claim 1, wherein the program instructions cause the processor to further obtain, by referring to a keyword database in which a group including a specific field keyword is stored, with respect to each string included in the group of the wildcard strings, a degree of similarity to the input keyword and a degree of similarity to the specific field keyword,
wherein the processor selects a string whose degree of similarity to the input keyword is highest among strings included in the group of the wildcard strings or among strings included in a group of wildcard strings that exist in the non-matched document information group, as the similar keyword.

3. The document search device as claimed in claim 1, wherein the program instructions cause the processor to further determine whether degrees of similarity of said strings selected as the similar keyword satisfy a predetermined condition,
wherein the processor selects a string whose degree of similarity satisfies the predetermined condition as a highly similar keyword among the selected strings, in a case where degrees of similarity of all the selected strings do not satisfy the predetermined condition,
wherein the processor searches for the highly similar keyword in the non-matched document information group, and
wherein the processor outputs a search result obtained by searching for the highly similar keyword.

4. The document search device as claimed in claim 3, wherein the processor displays document information of the search result obtained by searching for the input keyword and document information of the search result obtained by searching for the highly similar keyword as a list on a terminal device.

5. The document search device as claimed in claim 1, wherein the program instructions cause the processor to further select a string whose degree of similarity to the input keyword is higher than or equal to a predetermined threshold among strings whose degrees of similarity to the input keyword are not highest, among strings included in the group of the wildcard strings or among strings included in the group of the wildcard strings that exist in the non-matched document information group, as a dissimilar keyword,
  wherein the processor searches for the dissimilar keyword in the non-matched document information group, and
  wherein the processor outputs a search result obtained by searching for the dissimilar keyword together with the search result obtained by searching for the input keyword and the search result obtained by searching for the similar keyword.

6. The document search device as claimed in claim 5, wherein the processor displays document information of the search result obtained by searching for the dissimilar keyword together with document information of the search result obtained by searching for the input keyword and document information of the search result obtained by searching for the similar keyword as a list on a terminal device.

7. The document search device as claimed in claim 1, wherein the processor displays document information of the search result obtained by searching for the input keyword and document information of the search result obtained by searching for the similar keyword as a list on a terminal device.

8. The document search device as claimed in claim 7,
  wherein the text data corresponds to identification information that identifies the document image data in the document information, and
  wherein the processor accepts a selection of the document information in the list and displays the document image data corresponding to the identification information of the selected document information together with the list, by referring to a document image database in which the document image data is stored in association with the identification information of the document image data.

9. A document search device comprising:
  a processor; and
  a memory storing program instructions that cause the processor to
  search for an input keyword in a document database in which document information including text data is stored, the text data being extracted by using a character recognition process from document image data generated by imaging a paper document;
  select a similar keyword in accordance with a degree of similarity to the input keyword from a group of wildcard strings generated from the input keyword and search for the similar keyword in the document database, the degree of similarity being determined by comparing each character of the input keyword with a corresponding character of a wildcard string in the group of wildcard strings; and
  output a search result obtained by searching for the input keyword in the document database and a search result obtained by searching for the similar keyword in the document database,
  wherein the program instructions cause the processor to further extract, from the document database, a non-matched document information group that is a document information group other than the search result obtained by searching for the input keyword,
  wherein the processor searches for the similar keyword in the non-matched document information group, and
  wherein the processor outputs the search result obtained by searching for the input keyword in the document database and a search result obtained by searching for the similar keyword in the non-matched document information group.

10. A document search device comprising:
  a processor; and
  a memory storing program instructions that cause the processor to
  search for an input keyword in a document database in which document information including text data is stored, the text data being extracted by using a character recognition process from document image data generated by imaging a paper document;
  obtain a search result by searching for the input keyword;
  extract, from the document database, a non-matched document information group that is a document information group other than the search result obtained by searching for the input keyword;
  search for a wildcard string generated from the input keyword in the non-matched document information group to obtain a group of wildcard strings that exist in the non-matched document information group;
  select a similar keyword in accordance with a degree of similarity to the input keyword from the group of the wildcard strings that exist in the non-matched document information group and search for the similar keyword in the non-matched document information group; and
  output the search result obtained by searching for the input keyword in the document database and a search result obtained by searching for the similar keyword in the non-matched document information group.

11. A non-transitory computer-readable recording medium having stored therein a document search program for causing a computer to execute a process comprising:
  searching for an input keyword in a document database in which document information including text data is stored, the text data being extracted by using a character recognition process from document image data generated by imaging a paper document;
  obtaining a search result by searching for the input keyword;
  extracting, from the document database, a non-matched document information group that is a document information group other than the search result obtained by searching for the input keyword;
  searching for a wildcard string generated from the input keyword in the non-matched document information group to obtain a group of wildcard strings that exist in the non-matched document information group;
  selecting a similar keyword in accordance with a degree of similarity to the input keyword from the group of the wildcard strings that exist in the non-matched document information group and searching for the similar keyword in the non-matched document information group by using the document search process; and
  outputting the search result obtained by searching for the input keyword in the document database and a search result obtained by searching for the similar keyword in the non-matched document information group.

12. A document search method performed by a computer, the method comprising:
  searching for an input keyword in a document database in which document information including text data is stored, the text data being extracted by using a character recognition process from document image data generated by imaging a paper document;

obtaining a search result by searching for the input keyword;

extracting, from the document database, a non-matched document information group that is a document information group other than the search result obtained by searching for the input keyword;

searching for a wildcard string generated from the input keyword in the non-matched document information group to obtain a group of wildcard strings that exist in the non-matched document information group;

selecting a similar keyword in accordance with a degree of similarity to the input keyword from the group of the wildcard strings that exist in the non-matched document information group and searching for the similar keyword in the non-matched document information group at the document search step; and outputting the search result obtained by searching for the input keyword in the document database and a search result obtained by searching for the similar keyword in the non-matched document information group.

\* \* \* \* \*